(12) United States Patent
Kanzaki

(10) Patent No.: US 11,899,990 B2
(45) Date of Patent: Feb. 13, 2024

(54) PRINTING DEVICE, PRINTING METHOD, AND NON-TRANSITORY COMPUTER-READABLE STORAGE MEDIUM FOR DISPLAYING PREVIEW IMAGES CORRESPONDING TO RESULTS OF GAMUT MAPPING PROCESSES

(71) Applicant: BROTHER KOGYO KABUSHIKI KAISHA, Nagoya (JP)

(72) Inventor: Takashi Kanzaki, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 18/325,634

(22) Filed: May 30, 2023

(65) Prior Publication Data
US 2023/0384987 A1    Nov. 30, 2023

(30) Foreign Application Priority Data
May 30, 2022    (JP) .................................. 2022-087829

(51) Int. Cl.
    *G06F 3/12*    (2006.01)
(52) U.S. Cl.
    CPC .......... *G06F 3/1208* (2013.01); *G06F 3/1256* (2013.01); *G06F 3/1204* (2013.01)

(58) Field of Classification Search
None
See application file for complete search history.

(56) References Cited

FOREIGN PATENT DOCUMENTS

| CA | 2293609 A1 | * | 12/1998 | |
|----|-----------|---|---------|---|
| CA | 2261376 A1 | * | 8/1999  | ............... A45C 1/06 |
| JP | 2005-117081 A | | 4/2005 | |
| JP | 2010-157920 A | | 7/2010 | |

* cited by examiner

*Primary Examiner* — Darryl V Dottin
(74) *Attorney, Agent, or Firm* — Scully, Scott, Murphy & Presser, PC

(57) ABSTRACT

A printing device includes a printing unit and a controller. The controller performs: acquiring image data; acquiring an image color gamut that is a specific area of a predetermined color space occupied by color values included in the image data; receiving information on a first color that is specified by a user and is present in the image color gamut; executing, on the basis of whether the first color is present in a printing color gamut that is a specific area of the predetermined color space occupied by color values of colors printable by the printing unit, different gamut mapping processes on the image data; displaying, prior to printing based on the image data, the first color and preview images corresponding to results of the gamut mapping processes; and printing, using the printing unit, an image corresponding to the preview image selected by the user among the displayed preview images.

19 Claims, 14 Drawing Sheets

FIG. 2
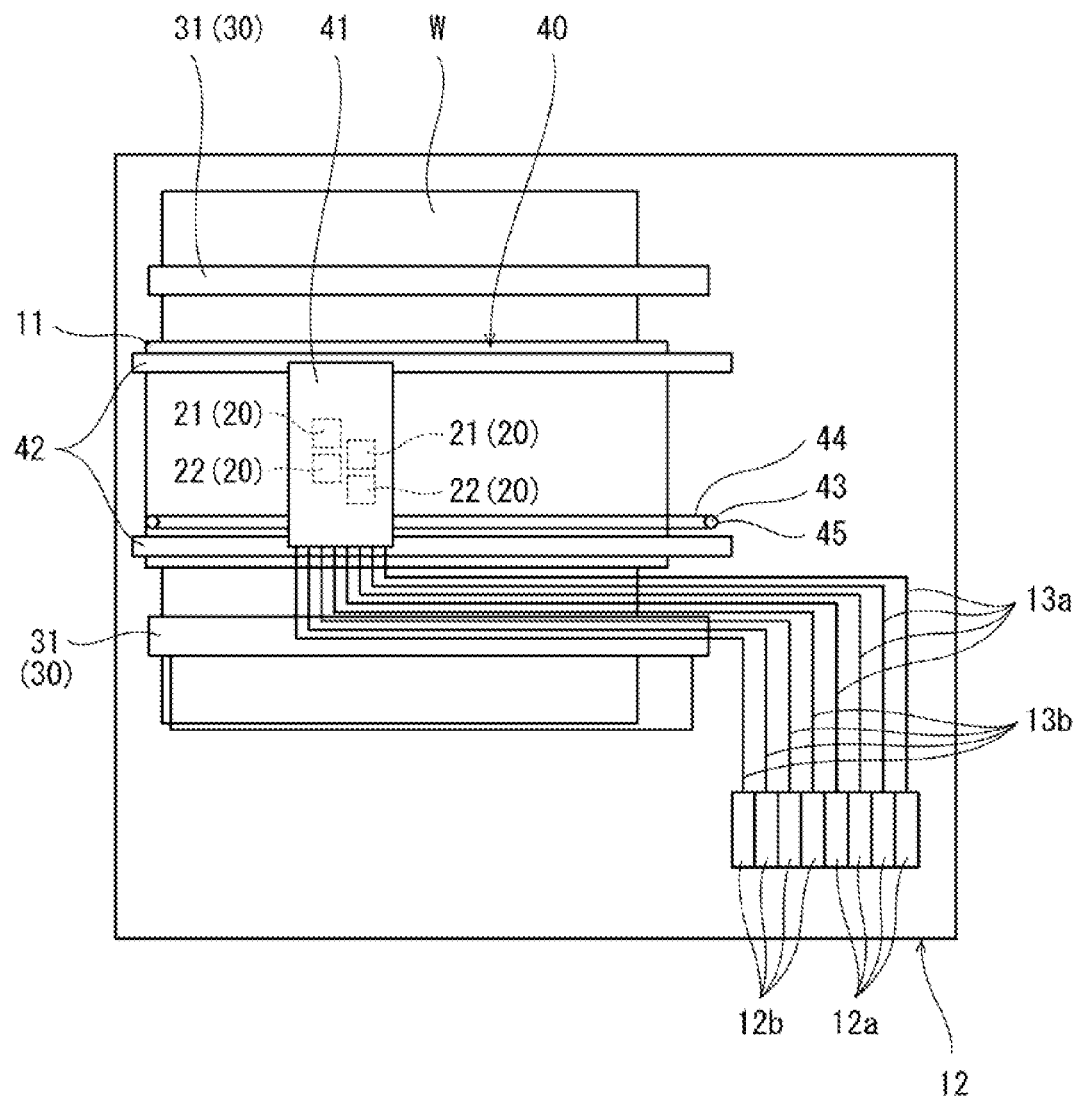
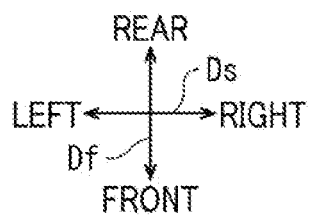

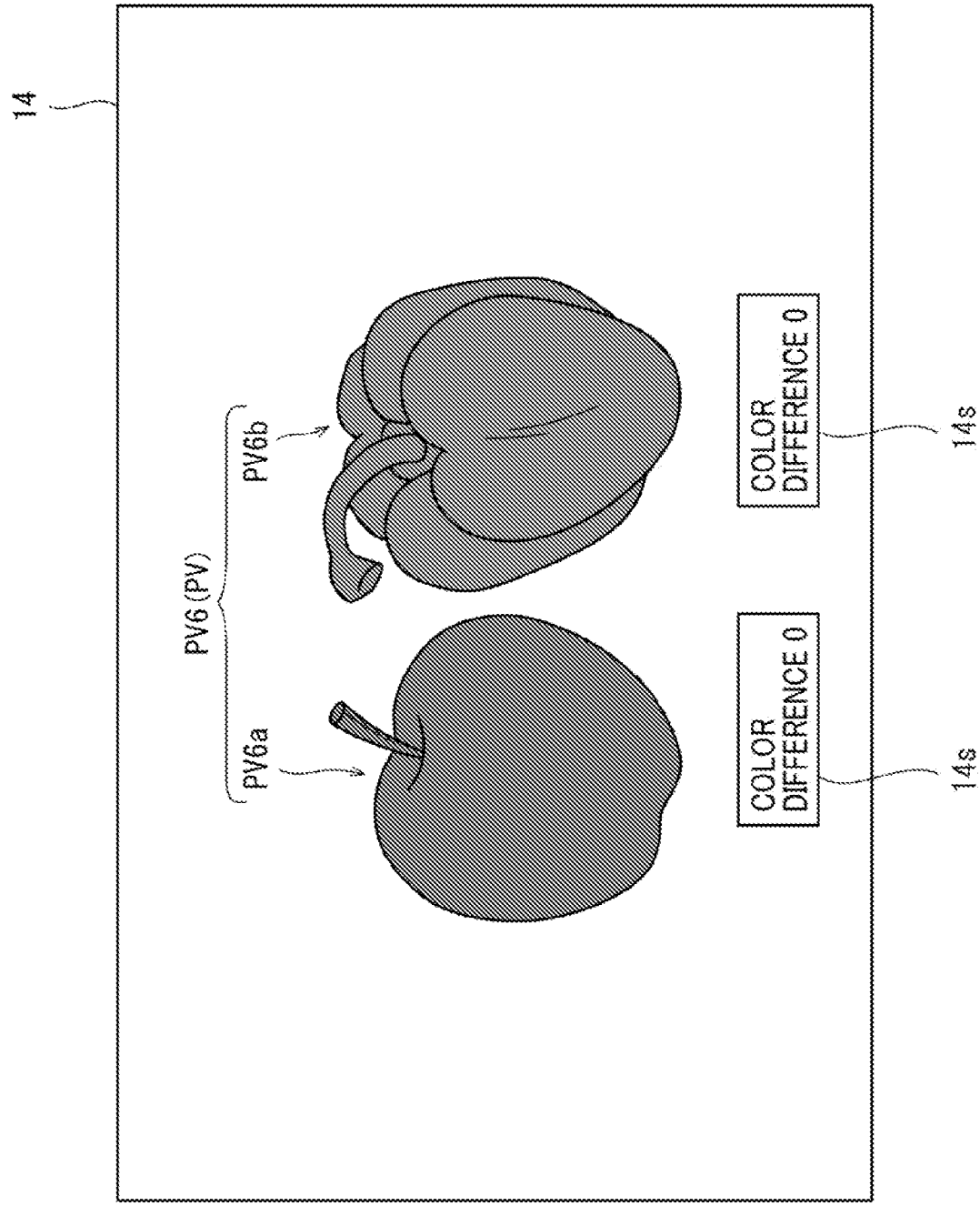

PRINTING DEVICE, PRINTING METHOD, AND NON-TRANSITORY COMPUTER-READABLE STORAGE MEDIUM FOR DISPLAYING PREVIEW IMAGES CORRESPONDING TO RESULTS OF GAMUT MAPPING PROCESSES

REFERENCE TO RELATED APPLICATIONS

This application claims priority from Japanese Patent Application No. 2022-087829 filed on May 30, 2022. The entire content of the priority application is incorporated herein by reference.

BACKGROUND ART

Conventional technologies known in the art perform a prescribed process on image data when determining that the image data contains colors outside the printing color gamut. In a conventional technology, for example, when the image data includes colors outside the printing color gamut, a process is performed to modify a reference color in a direction different from a predetermined color changing direction and to determine whether a prescribed number of colors that are selected in the color changing direction and that include the modified reference color contain any colors outside the printing color gamut. This process is repeated until all selected colors fall within the printing color gamut.

DESCRIPTION

However, user satisfaction with the printed images tends to decrease even when colors outside the printing color gamut are processed to fit within the printing color gamut and images are printed on print media based on the processed image data.

In view of the foregoing, it is an object of the present disclosure to provide a printing device, printing method, and non-transitory computer readable storage medium that can increase user satisfaction in printed images.

In order to attain the above and other object, according to one aspect, the present disclosure provides a printing device including a printing unit and a controller. The printing unit is configured to print on a printing medium using colorants in prescribed basic colors. The controller is configured to perform: (a) acquiring image data; (b) acquiring an image color gamut, the image color gamut being a specific area of a predetermined color space that is occupied by color values included in the image data acquired in (a); (c) receiving information on a first color specified by a user, the first color being present in the image color gamut acquired in (b); (d) executing, on the basis of whether the first color is present in a printing color gamut, two or more gamut mapping processes on the image data acquired in (a), the two or more gamut mapping processes being different from each other, the printing color gamut being a specific area of the predetermined color space that is occupied by color values of colors printable by the printing unit; (e) displaying, prior to printing based on the image data acquired in (a), the first color and preview images corresponding to results of the two or more gamut mapping processes; and (f) printing, using the printing unit, an image corresponding to the preview image selected by the user among the preview images displayed in (e).

According to another aspect, the present disclosure provides a printing method using a printing device including a printing unit. The printing method includes: (a) acquiring image data; (b) acquiring an image color gamut, the image color gamut being a specific area of a predetermined color space that is occupied by color values included in the image data acquired in (a); (c) receiving information on a first color specified by a user, the first color being present in the image color gamut acquired in (b); (d) executing, on the basis of whether the first color is present in a printing color gamut, two or more gamut mapping processes on the image data acquired in (a), the two or more gamut mapping processes being different from each other, the printing color gamut being a specific area of the predetermined color space that is occupied by color values of colors printable by the printing unit; (e) displaying, prior to printing based on the image data acquired in (a), the first color and preview images corresponding to results of the two or more gamut mapping processes; and (f) printing, using the printing unit, an image corresponding to the preview image selected by the user among the preview images displayed in (e).

According to still another aspect, the present disclosure provides a non-transitory computer-readable storage medium storing a set of instructions for a printing device. The printing device includes a printing unit and a controller. The printing unit is configured to print on a printing medium using colorants in prescribed basic colors. The set of instructions, when executed by the controller, causes the printing device to perform: (a) acquiring image data; (b) acquiring an image color gamut, the image color gamut being a specific area of a predetermined color space that is occupied by color values included in the image data acquired in (a); (c) receiving information on a first color specified by a user, the first color being present in the image color gamut acquired in (b); (d) executing, on the basis of whether the first color is present in a printing color gamut, two or more gamut mapping processes on the image data acquired in (a), the two or more gamut mapping processes being different from each other, the printing color gamut being a specific area of the predetermined color space that is occupied by color values of colors printable by the printing unit; (e) displaying, prior to printing based on the image data acquired in (a), the first color and preview images corresponding to results of the two or more gamut mapping processes; and (f) printing, using the printing unit, an image corresponding to the preview image selected by the user among the preview images displayed in (e).

FIG. 2 is a plan view of the configuration of the printing device in FIG. 1, including ejection heads.

FIG. 14 is a view illustrating a preview image for a case of printing an image represented by image data on a print medium using ink in different colors from basic colors.

Next, printing devices according to embodiments of the present disclosure will be described while referring to the accompanying drawings. The printing devices in the following description are each merely one embodiment of the present disclosure. Therefore, the present disclosure is not limited to the following embodiments, and elements may be added, omitted, and modified without departing from the spirit of the disclosure.

Figure 1:
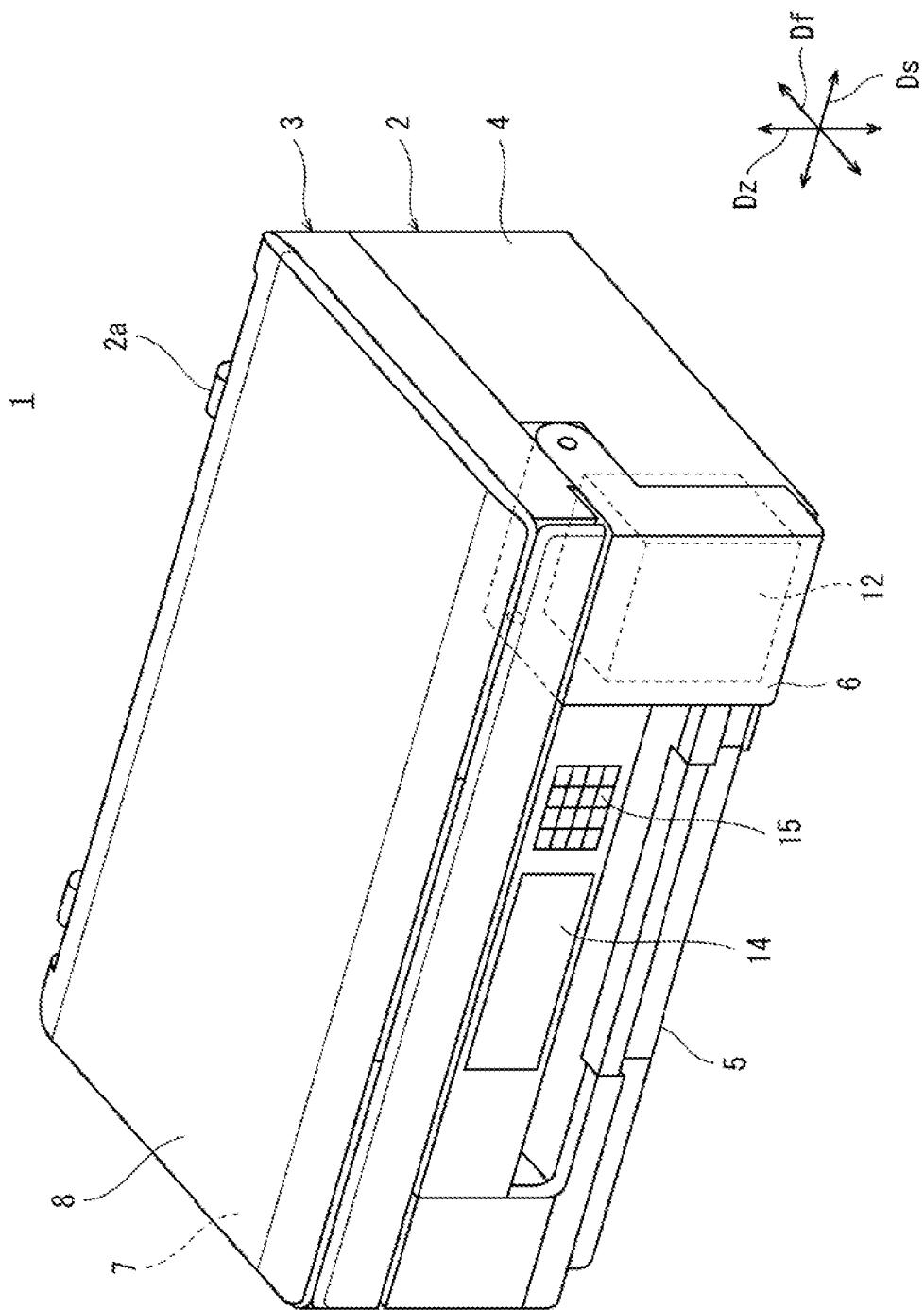
FIG. 1 is perspective view of the appearance of a printing device.

FIG. 1 is a perspective view illustrating the appearance of a printing device 1 according to one embodiment of the present disclosure. In FIG. 1, three directions orthogonal to one another will be defined as a first direction Ds, a second direction Df, and a third direction Dz. In this embodiment, the first direction Ds is the moving direction of a carriage 41 described later, the second direction Df is the conveying direction of a print medium W described later, and the third direction Dz is the up-down direction, for example. Thus, in the following description, Ds will be called the moving direction, Df will be called the conveying direction, and Dz will be called the up-down direction.

As illustrated in FIG. 1, the printing device 1 is an inkjet printer configured to print images on print media W (see FIG. 2), such as a printing paper. The exterior of the printing device 1 has a parallelepiped shape. The printing device 1 includes a printing unit 2, and a scanning unit 3. However, the printing device 1 in FIG. 1 is merely an example and is not limited to this configuration. For example, the printing device 1 may include a printing unit (ejection head) configured to eject UV-curable ink droplets, and a light source configured to cure the ink droplets with ultraviolet light.

The scanning unit 3 is configured to generate image data by reading images using an image sensor. The printing unit 2 is configured to print this generated image data on a print medium W either accommodated in the printing device 1 or supplied into the printing device 1 from outside. The scanning unit 3 is arranged on top of the printing unit 2 and is coupled to the printing unit 2 by coupling parts 2a provided on the rear portion of the printing unit 2. When the front portion of the scanning unit 3 is lifted, the scanning unit 3 pivots upward about the coupling parts 2a, exposing the inside of the printing unit 2.

The scanning unit 3 includes a document platen 7, and a cover 8. The cover 8 is arranged so as to cover the top of the document platen 7. The scanning unit 3 is configured to scan images recorded on an original while the original is positioned between the document platen 7 and cover 8.

The printing unit 2 is configured to print images on print media W with ink supplied from tanks 12 described later. The printing unit 2 includes a case 4 that forms part of the housing of the printing device 1. The case 4 has an opening that communicates with the interior of the case 4. A cover 6 is mounted on the case 4 and is configured to open and close the opening of the case 4. A tray 5 for accommodating the print media W is disposed inside the case 4. The tray 5 can be pulled out to the front of the case 4 for replenishing print media W.

The tanks 12 store ink. The tanks 12 are exposed outside when the cover 6 is open. The tanks 12 are connected to ejection heads 20 (see FIG. 2) via channels for supplying ink to the ejection heads 20.

As illustrated in FIG. 2, the printing device 1 employs a serial head system and includes the ejection heads 20, a platen 11, the tanks 12, a conveying device 30, and a scanning device 40. However, the printing device 1 may employ a line head system. In this case, the scanning device 40 is omitted from the printing device 1, and the ejection heads 20 are immobile and have a length in the moving direction Ds that is greater than the printing area on the print medium W.

The ejection heads 20 use ink in basic colors (described later) to print images on print media W based on image data. Here, ink is an example of the colorants and the ejection heads is an example of the printing unit. The ejection heads 20 include two first ejection heads 21, and two second ejection heads 22, for example. The platen 11 has a flat top surface and defines the distance between a print medium W placed on this top surface and the bottom surfaces of the ejection heads 20 disposed so as to face this top surface. The tanks 12 are containers for storing ink. The number of tanks 12 is equal to or greater than the number of ink types. For example, the tanks 12 include four first tanks 12a that respectively store ink in one of the four basic colors, and one or more second tanks 12b that store ink in special colors.

Examples of basic color inks are cyan ink, yellow ink, magenta ink, and black ink. Special color inks have different colors from the basic colors. Examples of special color inks are red ink, green ink, and blue ink.

The first tanks 12a store ink in the basic colors and communicate with the first ejection heads 21 through first channels 13a. Ink in the basic colors is supplied from the first tanks 12a to the first ejection heads 21 via the first channels 13a. The second tanks 12b communicate with the second ejection heads 22 via second channels 13b. When the second tanks 12b store ink in special colors, the special color inks flow from the second tanks 12b into the second channels 13b, filling the second channels 13b. From the second channels 13b, the special color inks are supplied to the second ejection heads 22. Before ink in special colors is stored in the second tanks 12b, the second tanks 12b are filled with a storage solution different from the ink in special colors. The first channels 13a and second channels 13b are rubber tubes or plastic tubes, for example, which are preferably resistant to kinking.

The conveying device 30 includes two pairs of conveying rollers 31, and a conveying motor 32 (see FIG. 3), for example. The two pairs of conveying rollers 31 are arranged in the conveying direction Df (front-rear direction) with the platen 11 interposed therebetween in the conveying direction Df Each of the conveying rollers 31 has an axis extending in the moving direction Ds. The two conveying rollers 31 in each pair are arranged in the up-down direction Dz and are configured to nip a print medium W therebetween. One conveying roller 31 in each pair is connected to the conveying motor 32. The conveying rollers 31 rotate about their axes when driven by the conveying motor 32 and convey a print medium W over the platen 11 in the conveying direction Df.

The scanning device 40 includes the carriage 41, two guide rails 42, a scanning motor 43, and an endless belt 44. The two guide rails 42 extend in the moving direction Ds above the platen 11 with the ejection heads 20 interposed therebetween in the conveying direction Df. The ejection heads 20 are mounted on the carriage 41. The carriage 41 is supported on the two guide rails 42 so as to be movable in the moving direction Ds. The endless belt 44 extends in the moving direction Ds and is attached to the carriage 41. The endless belt 44 is also connected to the scanning motor 43 via a pulley 45. When the scanning motor 43 is driven, the endless belt 44 circulates to reciprocate the carriage 41 in the moving direction Ds along the guide rails 42. In this way, the carriage 41 is configured to move the ejection heads 20 in the moving direction Ds.

Figure 3:
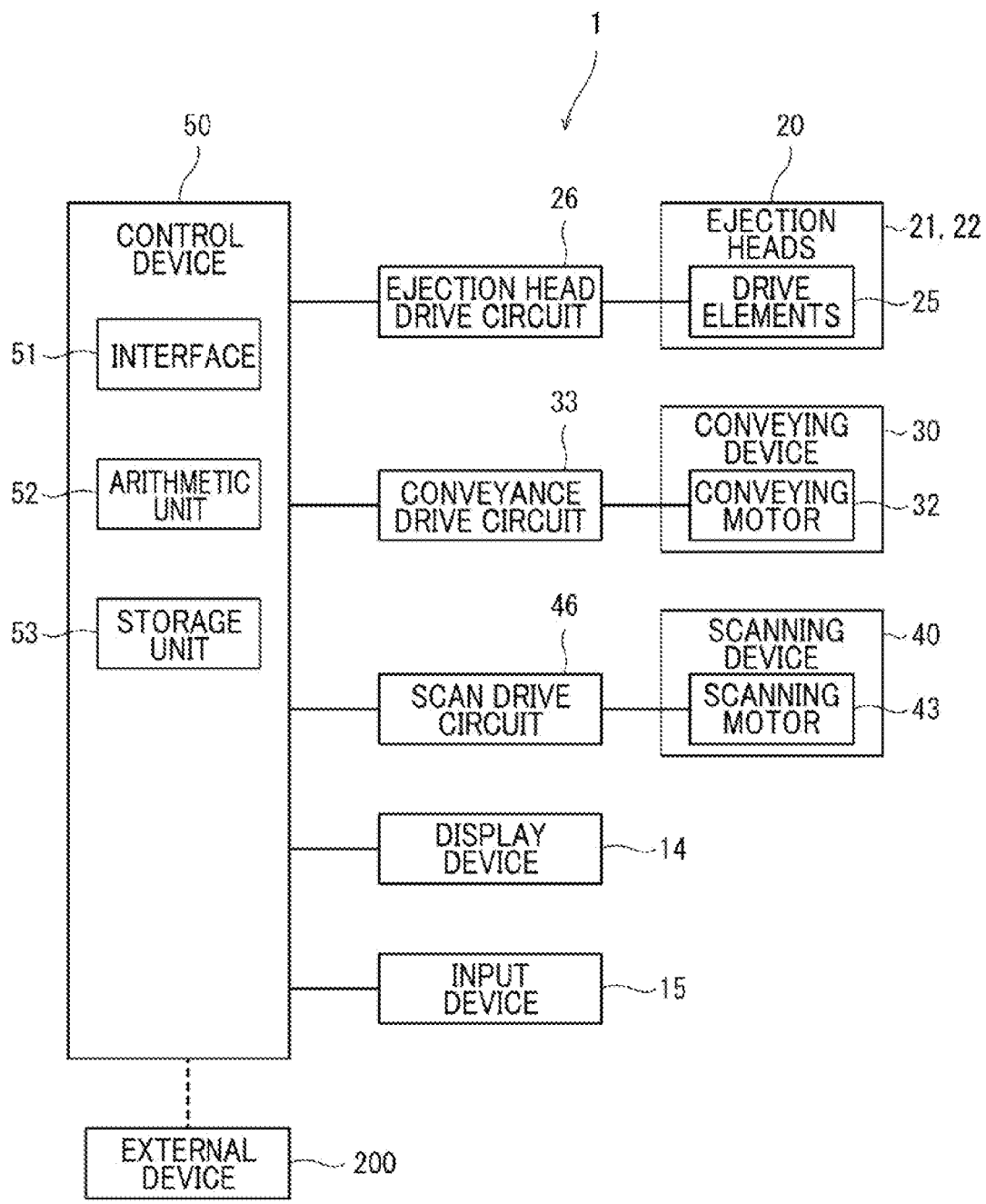
FIG. 3 is a block diagram of the configuration of the control system of the printing device in FIG. 1.

As illustrated in FIG. 3, each of the ejection heads 20 includes drive elements 25. The drive elements 25 may be piezoelectric elements, heating elements, electrostatic actuators, and the like. The drive elements 25 are provided for respective nozzles 27 in the ejection head 20 and are configured to apply pressure to ink to eject the ink from the corresponding nozzles 27.

The printing device 1 further includes a display device 14, an input device 15, and a control device 50. The control device 50 is an example of the controller. The control device 50 includes an interface 51, an arithmetic unit 52, and a storage unit 53. The interface 51 is configured to receive image data and other various data from an external device 200. The external device 200 may be a computer, a camera, a communication network, a storage medium, a display, a printer, or the like. The image data is raster data and the like representing an image to be printed on the print medium W. The image data includes information on printing conditions such as the type of print medium W and the like. The control device 50 may be configured as a standalone device, or a plurality of devices in a distributed arrangement. In the latter case, the devices may operate the printing device 1 in cooperation with each other.

The storage unit 53 is memory that the arithmetic unit 52 can access. The storage unit 53 includes RAM and ROM. The RAM temporarily stores various data, including data received from the external device 200, such as image data, and data converted by the arithmetic unit 52. The ROM stores a printing program, prescribed data, and the like for performing various data processes. The printing program need not necessarily be stored in the storage unit 53, and may be stored in an external storage medium such as a CD-ROM that is accessible by the arithmetic unit 52.

The arithmetic unit 52 includes at least one of circuits, including a processor such as a Central Processing Unit (CPU), an integrated circuit such as an Application-Specific Integrated Circuit (ASIC), and the like. By executing the printing program, the arithmetic unit 52 controls the components of the printing device 1 to implement a printing operation and other various operations.

The display device 14 is a display, for example. In accordance with instructions from the control device 50, the display device 14 displays images represented by image data, preview images PV described later, and the like. Note that the display device 14 may not be able to display images (uncalibrated images represented by image data) or preview images PV that are exactly the same as when printed on print media W with the ejection heads 20. In this specification, the description "the display device 14 displays images represented by image data, and preview images PV" means not only that the display device 14 displays images and preview images PV that are exactly the same as when printed on print media W with the ejection heads 20 but also that the display device 14 displays images and preview images PV that are substantially the same as when printed on print media W with the ejection heads 20. The input device 15 is configured of buttons and the like, for example, that the user operates. Alternatively, the input device 15 may be a touchscreen integrated with the display device 14.

The control device 50 is electrically connected to the conveying motor 32 of the conveying device 30 via a conveyance drive circuit 33 for controlling the drive of the conveying motor 32. Accordingly, the control device 50 is configured to control conveyance of the print medium W using the conveying device 30. The control device 50 is also electrically connected to the scanning motor 43 of the scanning device 40 via a scan drive circuit 46 for controlling the drive of the scanning motor 43. Accordingly, the control device 50 is configured to control movement of the ejection heads 20 using the scanning device 40. The control device 50 is further electrically connected to the drive elements 25 via an ejection head drive circuit 26. The control device 50 is configured to output control signals for the drive elements 25 to the ejection head drive circuit 26, and the ejection head drive circuit 26 is configured to generate and output drive signals to the drive elements 25 on the basis of the control signals. When driven according to the drive signals, the drive elements 25 eject ink from the corresponding nozzles 27.

In the printing device 1 having the above configuration, the control device 50 is configured to acquire image data and execute a printing operation on the basis of this image data. During this printing operation, the control device 50 controls the ejection heads 20 to eject ink onto the print medium W therefrom while moving the ejection heads 20 in the moving direction Ds in a printing path. Next, the control device 50 conveys the print medium W forward. The printing device 1 repeatedly alternates between a printing path and a conveying operation in this way to print an image on the print medium W based on the image data.

Below, color calibration according to the printing device 1 of the present embodiment will be described while referring to the accompanying drawings.

Figure 4:
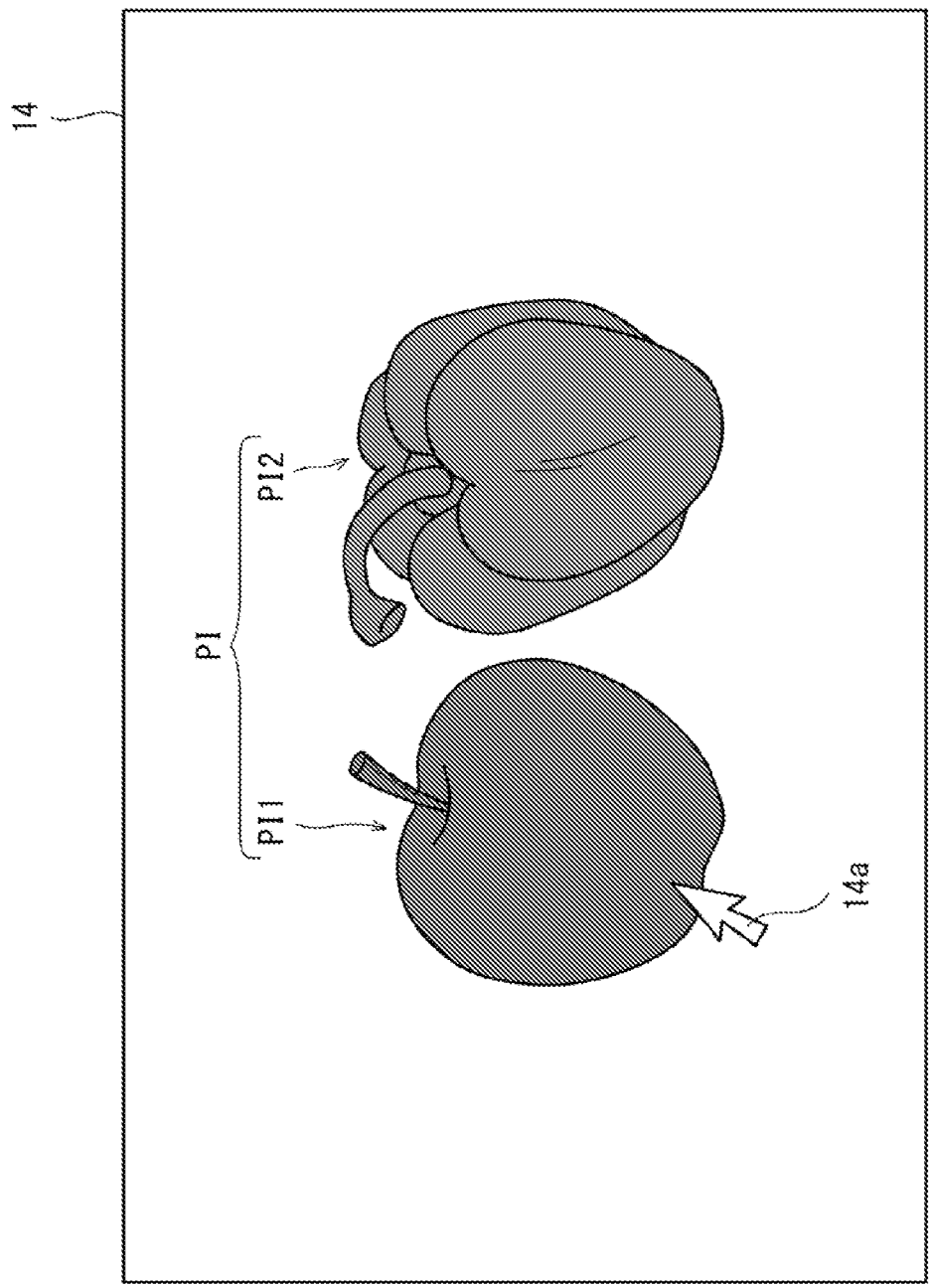
FIG. 4 is a view illustrating an example of images represented by image data that is displayed on a display device.
Figure 5:
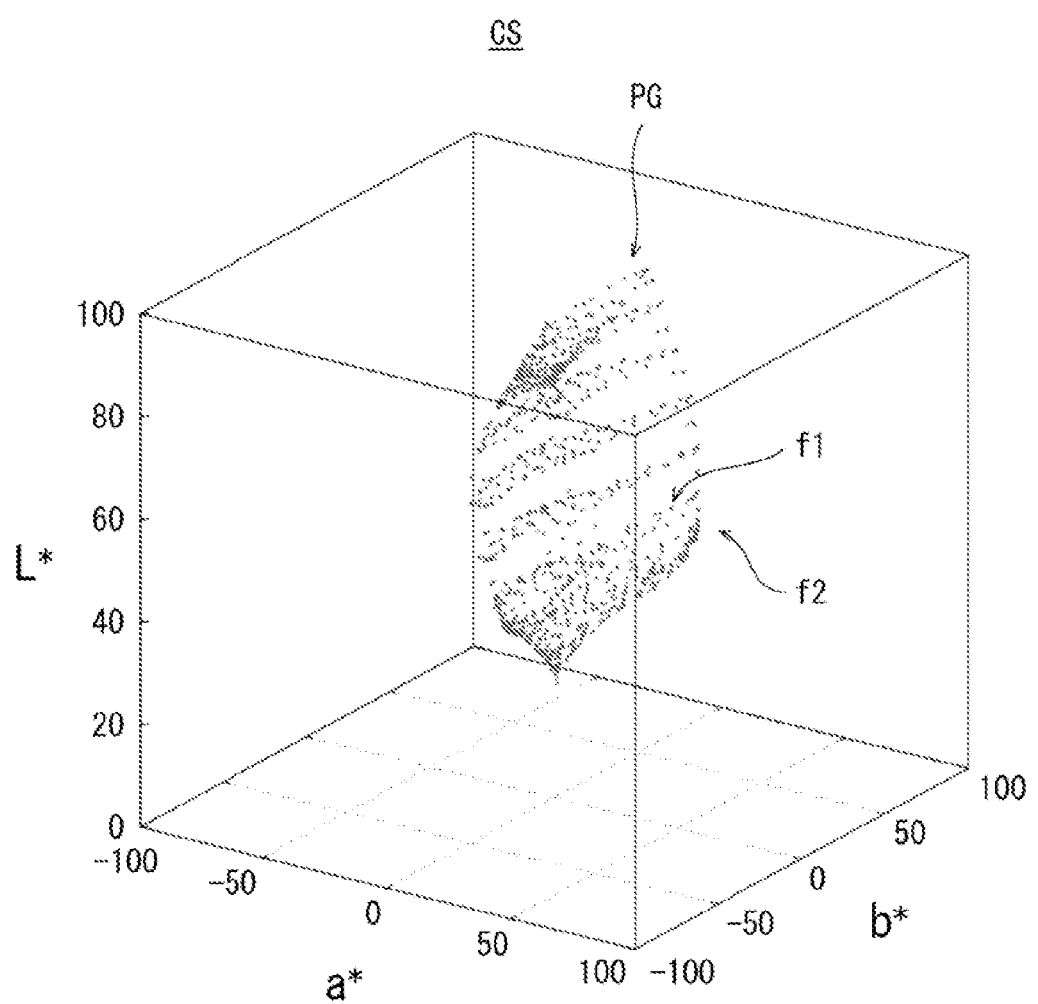
FIG. 5 is a view illustrating the position of a first red color value, the position of a second red color value, and a printing color gamut in a L*a*b* color space.

FIG. 4 illustrates an example of an image represented by image data that is displayed on the display device 14. FIG. 5 illustrates the position of a first red color value f1, the position of a second red color value f2, and a printing color gamut PG in the L*a*b* color space CS. Note that the first red color value f1 denotes the color value of a first red color and the second red color value f2 denotes the color value of a second red color.

The control device 50 receives image data transmitted from the external device 200. The image data includes color values. For example, the color value is represented by an RGB value in the RGB color space, i.e., as color coordinates in a device-dependent color space. The RGB value is constituted by a red component value, a green component value, and a blue component value, each of which represents one of a possible 256 gradations ranging from 0 to 255. The RGB value expresses a single color by the combination of these three component values.

The control device 50 acquires an image color gamut, which is a specific area of a predetermined color space that is occupied by the color values included in the image data. In this case, the control device 50 obtains the image color gamut by converting the RGB values in the image data to Lab values on the basis of predetermined correlations between RGB values and Lab values. Lab values are color values in the device-independent L*a*b* color space CS of FIG. 5 expressed by Cartesian coordinates, with L representing lightness and a and b representing hue and saturation.

Next, the control device 50 displays on the display device 14 an image PI represented by the image data (image data having RGB values), as illustrated in FIG. 4. In this example, the image PI includes an apple image PI1 having the first red color, and a bell pepper image PI2 having the second red color, which is different from the first red color. To distinguish between them, the first and second red colors are rendered in different grayscale brightnesses in FIG. 4. This same display method is used in FIGS. 6, 7, 9, 10, 11, 13, and 14 described later.

When the image PI is displayed on the display device 14, the user operates the input device 15 to specify one of the apple image PI1 and bell pepper image PI2. For example, the user can specify the image on which the user wishes to focus. More specifically, the user specifies the image using a pointer 14a (in FIG. 4, the apple image PI1 is pointed to by the pointer 14a), and thus a color pointed to by the pointer 14a is specified by the user (in FIG. 4, the first red color in the apple image PI1 is specified by the user).

The control device 50 receives information on the first red color, which is a color in the image color gamut and has been specified by the user (hereinafter sometimes referred to as the "specified color" or "user-specified color"). In the present embodiment, the first red color is an example of the first color.

Next, the control device 50 acquires a printing color gamut PG, which is a specific area of the L*a*b* color space CS that is occupied by color values that the ejection heads 20 can print using ink in the basic colors. The color values for the basic colors are expressed by CMYK values, for example, which are color coordinates in the device-dependent CMYK color space. A CMYK value is constituted by a cyan component value, a magenta component value, a yellow component value, and a black component value, each of which represents one value from a prescribed range of gradations, for example. The CMYK value expresses a single color by the combination of these four component values. The L*a*b* color space CS is an example of the predetermined color space.

Next, on the basis of information regarding whether the user-specified first red color is present in the printing color gamut PG and whether the second red color is present in the printing color gamut PG, the control device 50 executes two or more gamut mapping process (color compression processes) with different methods (i.e., two or more different gamut mapping processes) on the received image data. In this embodiment, the second red color is an example of the second color. The gamut mapping processes performed by the control device 50 will be described later.

The basic colors in the present embodiment are as follows. The basic colors are colors that the printing device 1 can print. The basic colors include the individual colors of ink provided in the printing device 1 and colors formed by combining at least two of the individual colors of ink. For example, when the printing device 1 is provided with ink in the colors cyan, magenta, yellow, and black, the basic colors are colors including at least one of these four colors. The basic colors include the individual ink colors cyan, magenta, yellow, and black, as well as mixtures of two or more of these colors. The color values for the basic colors are stored in the storage unit 53 in advance and are expressed in CMYK values, for example.

Next, the control device 50 displays the first red color on the display device 14 and displays preview images PV (see FIG. 6) showing the results of the gamut mapping processes to preview prior to printing. Various examples of preview images PV will be described later.

After the user selects an image from among the preview images PV, the control device 50 controls the ejection heads 20 to print an image corresponding to the selected preview image. In other words, the user can view the preview images PV corresponding to the results of the gamut mapping processes prior to printing and can select any one of the preview images PV that the user wishes to print.

Here, the gamut mapping processes executed by the control device 50 and the preview images PV obtained through these processes will be described in detail.

As described above, the control device 50 executes the gamut mapping processes on the basis of information indicating whether the user-specified first red color exists within the printing color gamut PG and whether the second red color exists within the printing color gamut PG. Below, a description will be given for a case in which the first red color value f1 exists in the printing color gamut PG but the second red color value f2 does not exist in the printing color gamut PG (the case of FIG. 5) and a case in which neither the first red color value f1 nor the second red color value f2 exists in a printing color gamut PGa different from the printing color gamut PG (the case of FIG. 8).

As described above, the control device 50 determines whether the first red color value f1 exists in the printing color gamut PG and whether the second red color value f2 exists in the printing color gamut PG. When the first red color value f1 is in the printing color gamut PG but the second red color value f2 is not, as illustrated in FIG. 5, the control device 50 executes the following first and second gamut mapping processes. The first gamut mapping process is an example of the first process. The second gamut mapping process is an example of the second process.

In the first gamut mapping process, the control device 50 generates image data by maintaining (leaving) the first red color value f1 as is and replacing (converting) the second red color value f2 with (into) a color value in the printing color gamut PG. More specifically, the control device 50 generates image data by maintaining (leaving) the color values of the colors included in the apple image PI1 as they are and replacing (converting) the color values of the colors included in the bell pepper image PI2 with (into) the color values of colors in the printing color gamut PG.

In this case, the control device 50 replaces the second red color value f2 with the color value of a color in the printing color gamut PG that approximates the second red color. The color value of a color that approximates the second red color denotes the color value in the printing color gamut PG that is closest in distance to the second red color value f2. For example, the color value of a color that approximates the second red color may be the color value at the point where the printing color gamut PG intersects a perpendicular line drawn from the position of the second red color value f2 to the printing color gamut PG. This perpendicular line may be the line connecting the position of the second red color value f2 to the printing color gamut PG with the shortest distance. Moreover, in the first gamut mapping process, the same color conversion (the same color replacement) as that performed on the first red color value f1 in the first gamut mapping process is performed on each of the color values of the remaining colors included in the apple image PI1 (i.e., the specified image) by the control device 50. That is, the color values of the remaining colors included in the apple image PI1 (i.e., the specified image) are also left unchanged, i.e., are maintained as they are. Furthermore, in the first gamut mapping process, the same color conversion (the same color replacement) as that performed on the second red color value f2 in the first gamut mapping process is performed on each of the color values of the remaining colors included in the bell pepper image PI2 by the control device 50.

Figure 6:
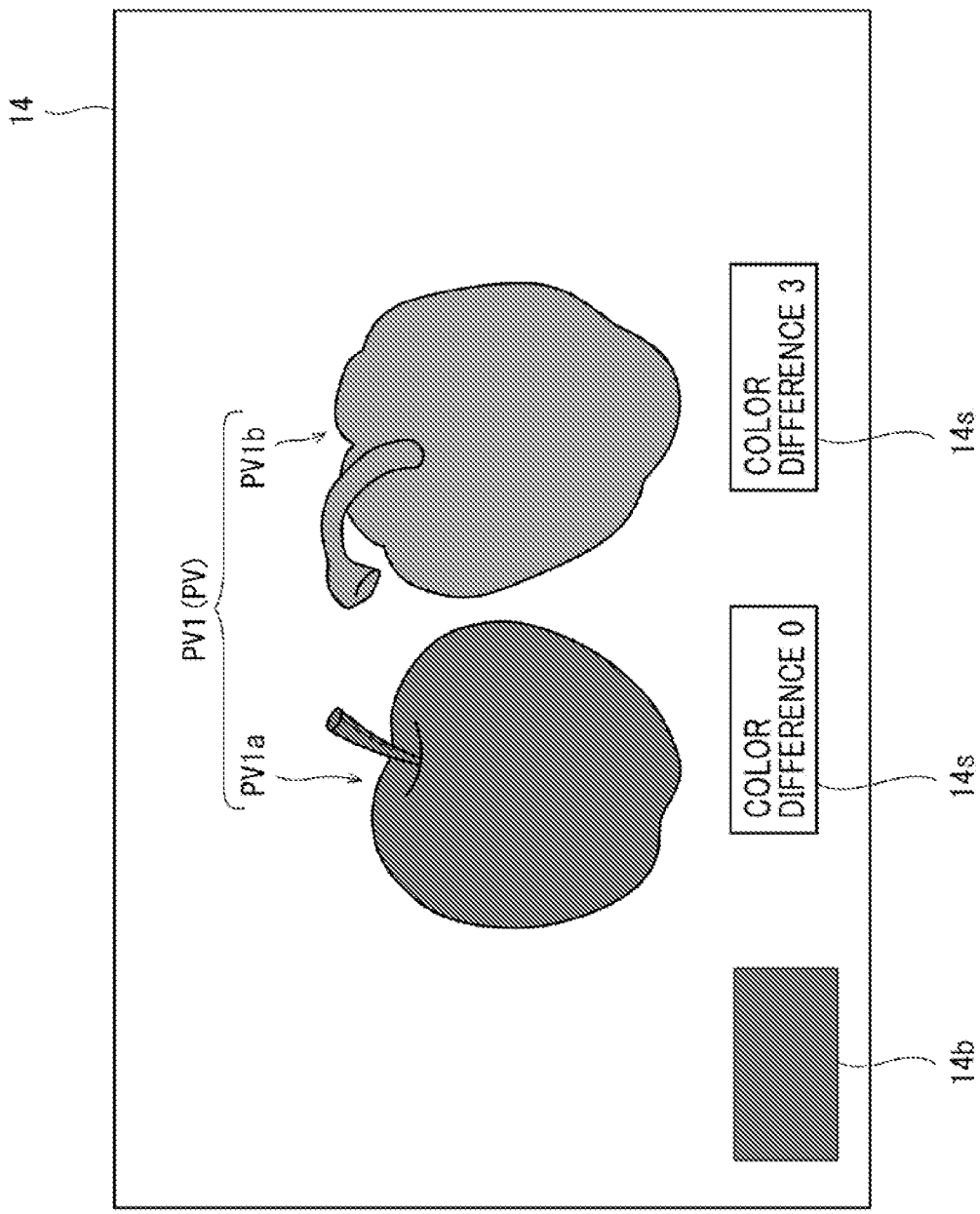
FIG. 6 is a view illustrating a first preview image resulting from a first gamut mapping process performed by the control device.

As illustrated in FIG. 6, the control device 50 displays on the display device 14 a first preview image PV1 represented by the image data generated in the first gamut mapping process. The control device 50 also displays the first red color (the specified color) in a display area 14b of the display device 14. Note that the display area 14b has been omitted from FIG. 7 and subsequent drawings.

The first preview image PV1 includes an apple preview image PV1a having the first red color, and a bell pepper preview image PV1b having a third red color, which differs from the second red color. That is, the color values of the apple preview image PV1a are the same as the color values of the apple image PI1 since the first red color value f1 and the remaining colors in the apple image PI1 have been left unchanged in the first gamut mapping process. This ensures high reproducibility of the apple image PI1 in the apple preview image PV1a. In contrast, the bell pepper preview image PV1b obtained in the first gamut mapping process has reduced reproducibility and loss of gradations (i.e., loss of tonality, such as loss of surface irregularities). To facilitate understanding, FIG. 6 and FIG. 9 described later exaggerate the states of the bell pepper preview images PV1b and PV3b, omitting all lines depicting surface irregularities, but some lines depicting surface irregularities may remain. The third red color is an example of the replacement color.

As illustrated in FIG. 6, the display device 14 is provided with two display areas 14s for displaying color differences. The control device 50 displays the color difference between the first red color before the first gamut mapping process and the first red color after the first gamut mapping process (i.e., a color resulting from the first gamut mapping process on the first red color) in one display area 14s and displays the color difference between the second red color before the first gamut mapping process and the third red color after the first gamut mapping process (i.e., a color resulting from the first gamut mapping process on the second red color) in the other display area 14s. This enables the user to recognize each color difference resulting from the first gamut mapping process. While these color differences are displayed as numbers in the display areas 14s in this embodiment, the color differences may be displayed as shades of colors or the like.

In the second gamut mapping process, on the other hand, the control device 50 generates image data by replacing both the first red color and second red color with colors in the printing color gamut PG so that tonality (tonal range) is maintained between the first red color and the second red color. More specifically, the control device 50 generates image data by replacing (converting) the color values of the colors included in the apple image PI1 and the color values of the colors included in the bell pepper image PI2 with (into) the color values of colors in the printing color gamut PG so that tonality (tonal range) is maintained between an apple image (i.e., the colors included in the apple image) resulting from the second gamut mapping process on the apple image PI1 and a bell pepper image (i.e., the colors included in the bell pepper image) resulting from the second gamut mapping process on the bell pepper image PI2.

In this example, the control device 50 replaces the first red color value f1 with the color value of a color in the printing color gamut PG that approximates the first red color and replaces the second red color value f2 with the color value of a color in the printing color gamut PG that approximates the second red color. Moreover, in the second gamut mapping process, the same color conversion (the same color replacement) as that performed on the first red color value f1 in the second gamut mapping process is performed on each of the color values of the remaining colors included in the apple image PI1 (i.e., the specified image) by the control device 50. Furthermore, in the second gamut mapping process, the same color conversion (the same color replacement) as that performed on the second red color value f2 in the second gamut mapping process is performed on each of the color values of the remaining colors included in the bell pepper image PI2 by the control device 50. The above term "tonality" will be described later.

Figure 7:
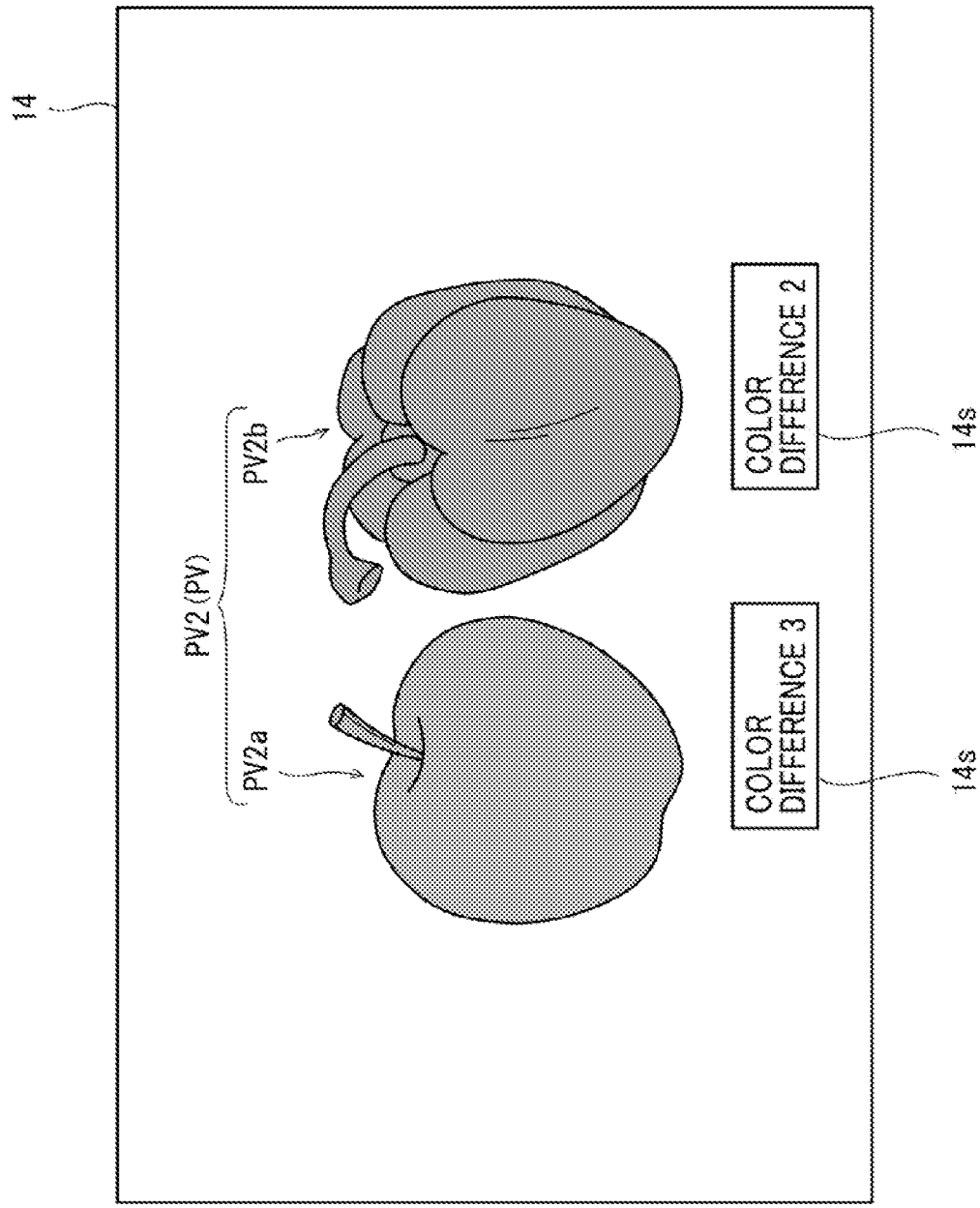
FIG. 7 is a view illustrating a second preview image resulting from a first gamut mapping process performed by the control device.

As illustrated in FIG. 7, the control device 50 displays on the display device 14 a second preview image PV2 represented by the image data generated in the second gamut mapping process. The second preview image PV2 in the example of FIG. 7 includes an apple preview image PV2a having a fourth red color that differs from the first red color, and a bell pepper preview image PV2b having a fifth red color that differs from both the second and third red colors. The fourth red color and the fifth red color are colors resulting from the second gamut mapping process on the first red color and the second red color, respectively. The second gamut mapping process can reproduce surface irregularities in the bell pepper preview image PV2b (i.e., clipping does not occur to surface irregularities) by ensuring tonality (gradation) of the bell pepper preview image PV2b while sacrificing some reproducibility of the apple preview image PV2a and bell pepper preview image PV2b. The fourth red color is an example of the replacement color. The fifth red color is an example of the replacement color.

The control device 50 displays the color difference between the first red color before the second gamut mapping process and the fourth red color after the second gamut mapping process (i.e., a color resulting from the second gamut mapping process on the first red color) in one display area 14s and displays the color difference between the second red color before the second gamut mapping process and the fifth red color after the second gamut mapping process (i.e., a color resulting from the second gamut mapping process on the second red color) in the other display area 14s. As a result, the user can recognize the color differences resulting from the second gamut mapping process.

Here, the term "tonality" will be described using the above first and second gamut mapping processes as an example. In this description, L will denote the distance within the L*a*b* color space CS between a predetermined reference point and the position of the color value of the first red color. L1 will denote the distance within the L*a*b* color space CS between the predetermined reference point and the position of the color value of a color resulting from the first gamut mapping process on the first red color. L2 will denote the distance within the L*a*b* color space CS between the predetermined reference point and the position of the color value of a color resulting from the second gamut mapping process on the first red color. I will denote the distance within the L*a*b* color space CS between the predetermined reference point and the position of the color value of the second red color. I1 will denote the distance within the L*a*b* color space CS between the predetermined reference point and the position of the color value of a color resulting from the first gamut mapping process on the second red color. I2 will denote the distance within the L*a*b* color space CS between the predetermined reference point and the position of the color value of a color resulting from the second gamut mapping process on the second red color. In the present embodiment, the predetermined reference point is the origin of the L*a*b* color space CS (i.e., the point with L*=50, a*=0, b*=0). However, the predetermined reference point need not necessarily be the origin of the L*a*b* color space CS but can be determined as appropriate.

Since the first red color value (the color value of the first red color) is preserved (maintained) in the first gamut mapping process, the distance L prior to processing becomes the distance L1 (=L) after processing. Further, since the second red color value (the color value of the second red color) is converted to the third red color value (the color value of the third red color) in the first gamut mapping process, the distance I prior to processing becomes a distance I1 (≠I) after processing. Therefore, L1/L=1, but I1/I≠1. Accordingly, (L1/L)≠(I1/I). Thus, tonality between the first red color and second red color is considered not maintained when (L1/L)≠(I1/I) is true, i.e., when the ratio of the distance L1 to the distance L is not equal to the ratio of the distance I1 to the distance I.

In this case, as described above, the same conversion as that performed on the first red color in the first gamut mapping process is performed on each of the remaining colors in the apple image PI1, and the same conversion as that performed on the second red color in the first gamut mapping process is performed on each of the remaining colors in the bell pepper image PI2. That is, the remaining colors in the apple image PI1 are also converted (replaced) using the conversion ratio L1/L (=1), i.e., with the same conversion ratio as that applied to the conversion (the replacement) of the first red color, and the remaining colors in the bell pepper image PI2 are also converted (replaced) using the conversion ratio I1/I (≠1), i.e., with the same conversion ratio as that applied to the conversion (the replacement) of the second red color. Accordingly, tonality (tonal range) is considered not maintained between an apple image (i.e., the colors included in the apple image) resulting from the first gamut mapping process on the apple image PI1 and a bell pepper image (i.e., the colors included in the bell pepper image) resulting from the first gamut mapping process on the bell pepper image PI2. Note that the conversion (replacement) of a color using the conversion ratio L1/L (=1) denotes that the color is maintained as it is.

On the other hand, since the color value for the first red color is not maintained and the first red color is converted to the fourth red color in the second gamut mapping process, the distance L prior to processing becomes a distance L2 (≠L) after processing. Further, since the second red color is converted to the fifth red color in the second gamut mapping process, the distance I prior to processing becomes a distance I2 (≠I) after processing. In the second gamut mapping process, the first red color and second red color are converted to respective replacement colors that satisfy the expression (L2/L)=(I2/I). Thus, tonality between the first red color and second red color is considered maintained when (L2/L)=(I2/I) is satisfied, i.e., when the ratio of the distance L2 to the distance L is equivalent to the ratio of the distance I2 to the distance I.

In this case, as described above, the same conversion as that performed on the first red color in the second gamut mapping process is performed on each of the remaining colors in the apple image PI1, and the same conversion as that performed on the second red color in the second gamut mapping process is performed on each of the remaining colors in the bell pepper image PI2. That is, the remaining colors in the apple image PI1 are also converted (replaced) using the conversion ratio L2/L (=I2/I), i.e., with the same conversion ratio as that applied to the conversion (the replacement) of the first red color, and the remaining colors in the bell pepper image PI2 are also converted (replaced) using the conversion ratio I2/I (=L2/L), i.e., with the same conversion ratio as that applied to the conversion (the replacement) of the second red color. Accordingly, tonality (tonal range) is considered maintained between an apple image (i.e., the colors included in the apple image) resulting from the second gamut mapping process on the apple image PI1 and a bell pepper image (i.e., the colors included in the bell pepper image) resulting from the second gamut mapping process on the bell pepper image PI2.

Figure 8:
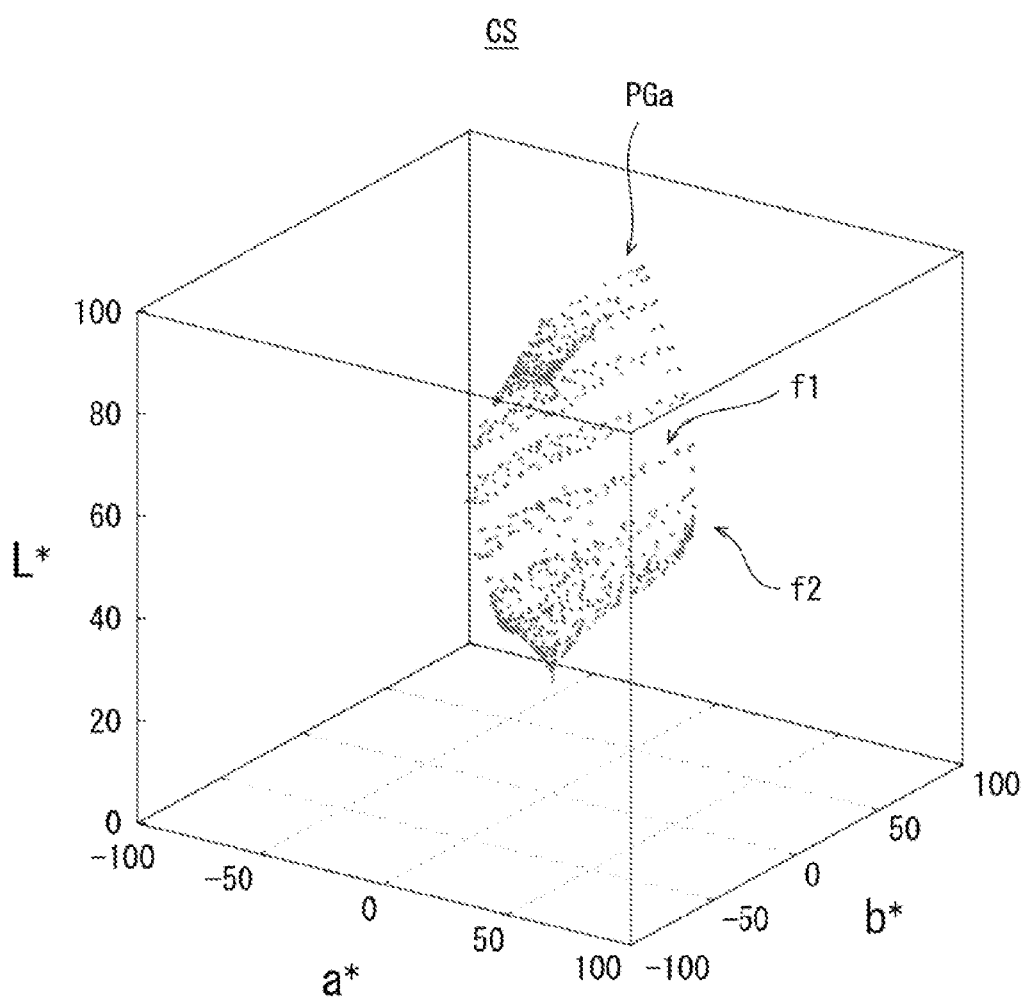
FIG. 8 is a view illustrating the position of a first red color value, the position of a second red color value, and a printing color gamut different from the printing color gamut of FIG. 5 in the L*a*b* color space.

Next, gamut mapping processes will be described for a case in which neither the first red color value f1 nor the second red color value f2 exists in the printing color gamut PGa. FIG. 8 illustrates the position of the first red color value f1, the position of the second red color value f2, the printing color gamut PGa in the L*a*b* color space CS. The printing color gamut PGa in FIG. 8 differs from the printing color gamut PG in FIG. 5.

The control device 50 first determines whether the first red color value f1 exists in the printing color gamut PGa and whether the second red color value f2 is present in the printing color gamut PGa. When neither the first red color value f1 nor the second red color value f2 is present in the printing color gamut PGa, as in the example of FIG. 8, the control device 50 executes the following third gamut mapping process and fourth gamut mapping process. The third gamut mapping process is an example of the third process. The fourth gamut mapping process is an example of the fourth process.

In the third gamut mapping process, the control device 50 generates image data by replacing (converting) both the first red color value f1 and the second red color value f2 with (into) color values in the printing color gamut PGa while giving priority to approximating the first red color over the second red color. More specifically, the control device 50 generates image data by replacing (converting) both the color values of the colors included in the apple image PI1 and the color values of the colors included in the bell pepper image PI2 with (into) the color values of colors in the printing color gamut PGa while giving priority to approximating the colors included in the apple image PI1 over the colors included in the bell pepper image PI2.

In this case, the control device 50 replaces the first red color value f1 with the color value of a color in the printing color gamut PGa that approximates the first red color and replaces the second red color value f2 with the color value of a color in the printing color gamut PGa that approximates the second red color. For example, giving priority to approximating the first red color signifies that the first and second red colors are replaced so that the relationship ΔE1<ΔE2 is satisfied. Here, ΔE1 denotes the color difference between the first red color and the color replacing the first red color and ΔE2 denotes the color difference between the second red color and the color replacing the second red color. Moreover, in the third gamut mapping process, the same color conversion (the same color replacement) as that performed on the first red color value f1 in the third gamut mapping process is performed on each of the color values of the remaining colors included in the apple image PI1 (i.e., the specified image) by the control device 50. Furthermore, in the third gamut mapping process, the same color conversion (the same color replacement) as that performed on the second red color value f2 in the third gamut mapping process is performed on each of the color values of the remaining colors included in the bell pepper image PI2 by the control device 50.

Figure 9:
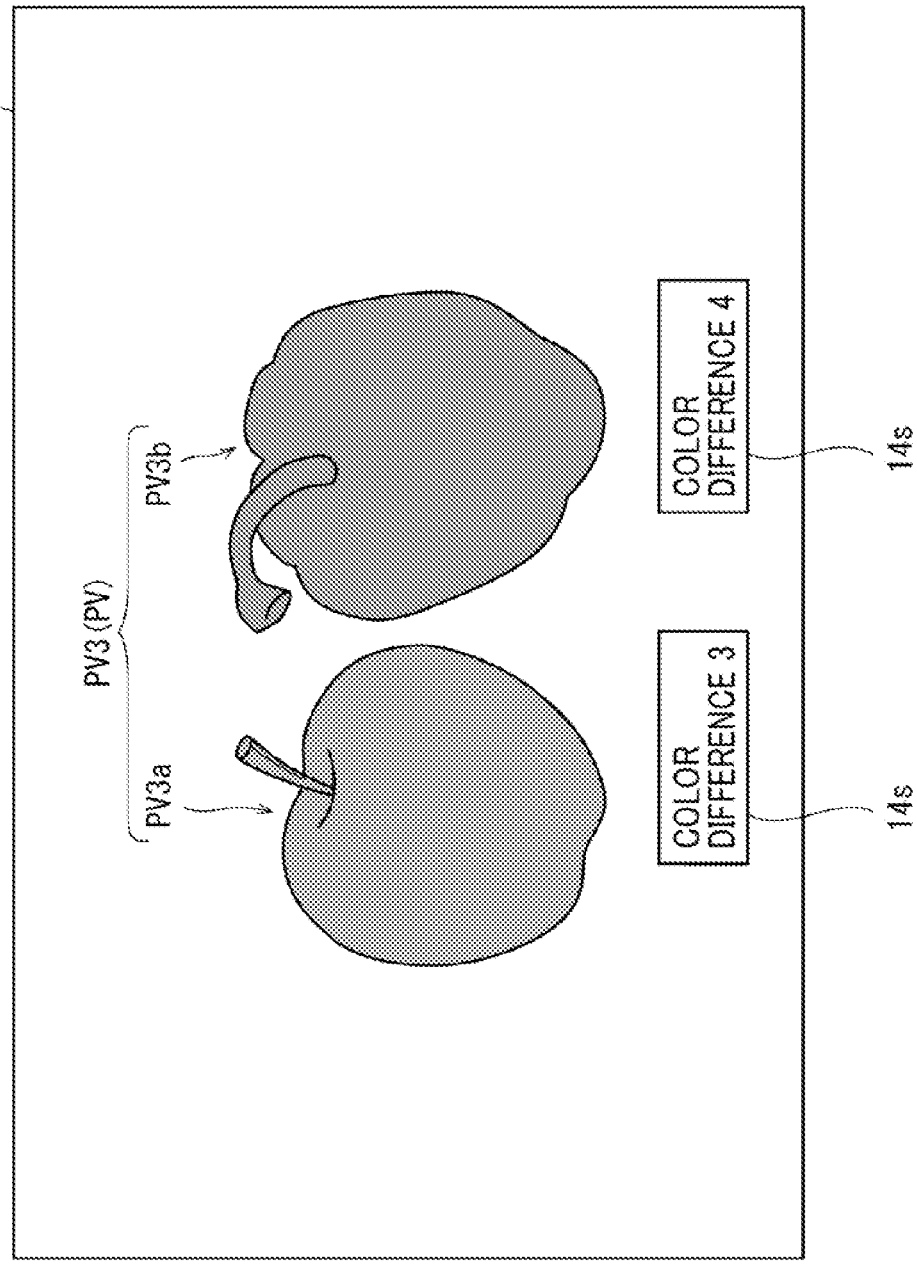
FIG. 9 is a view illustrating a third preview image resulting from a third gamut mapping process performed by the control device.

As shown in FIG. 9, the control device 50 displays on the display device 14 a third preview image PV3 represented by the image data generated in the third gamut mapping process. The third preview image PV3 in the example of FIG. 9 includes an apple preview image PV3a having a sixth red color that differs from the first red color, and a bell pepper preview image PV3b having a seventh red color that differs from the second red color. Thus, according to the third gamut mapping process, the apple preview image PV3a has reduced reproducibility but maintains gradations (tonality) while the bell pepper preview image PV3b has reduced reproducibility and loss of gradations. The sixth red color is an example of the replacement color. The seventh red color is an example of the replacement color.

As shown in FIG. 9, the control device 50 displays the color difference between the first red color before the third gamut mapping process and the sixth red color after the third gamut mapping process (i.e., a color resulting from the third gamut mapping process on the first red color) in one display area 14s and displays the color difference between the second red color before the third gamut mapping process and the seventh red color after the third gamut mapping process (i.e., a color resulting from the third gamut mapping process on the second red color) in the other display area 14s. As a result, the user can recognize each color difference resulting from the third gamut mapping process.

In the fourth gamut mapping process, on the other hand, the control device 50 generates image data by replacing (converting) the first red color value f1 and the second red color value f2 with (into) colors in the printing color gamut PGa to maintain tonality (tonal range) between the first red color and second red color. More specifically, the control device 50 generates image data by replacing (converting) the color values of the colors included in the apple image PI1 and the color values of the colors included in the bell pepper image PI2 with (into) the color values of colors in the printing color gamut PGa so that tonality (tonal range) is maintained between an apple image (i.e., the colors included in the apple image) resulting from the fourth gamut mapping process on the apple image PI1 and a bell pepper image (i.e., the colors included in the bell pepper image) resulting from the fourth gamut mapping process on the bell pepper image PI2.

In this case, the control device 50 replaces the first red color value f1 with the color value of a color in the printing color gamut PGa that approximates the first red color and replaces the second red color value f2 with the color value of a color in the printing color gamut PGa that approximates the second red color. Moreover, in the fourth gamut mapping process, the same color conversion (the same color replacement) as that performed on the first red color value f1 in the fourth gamut mapping process is performed on each of the color values of the remaining colors included in the apple image PI1 (i.e., the specified image) by the control device 50. Furthermore, in the fourth gamut mapping process, the same color conversion (the same color replacement) as that performed on the second red color value f2 in the fourth gamut mapping process is performed on each of the color values of the remaining colors included in the bell pepper image PI2 by the control device 50.

The fourth gamut mapping process includes a perceptual rendering intent process and a relative rendering intent process. Since the perceptual and relative rendering intent processes are both well-known methods, a description of these methods will be omitted.

Figure 10:
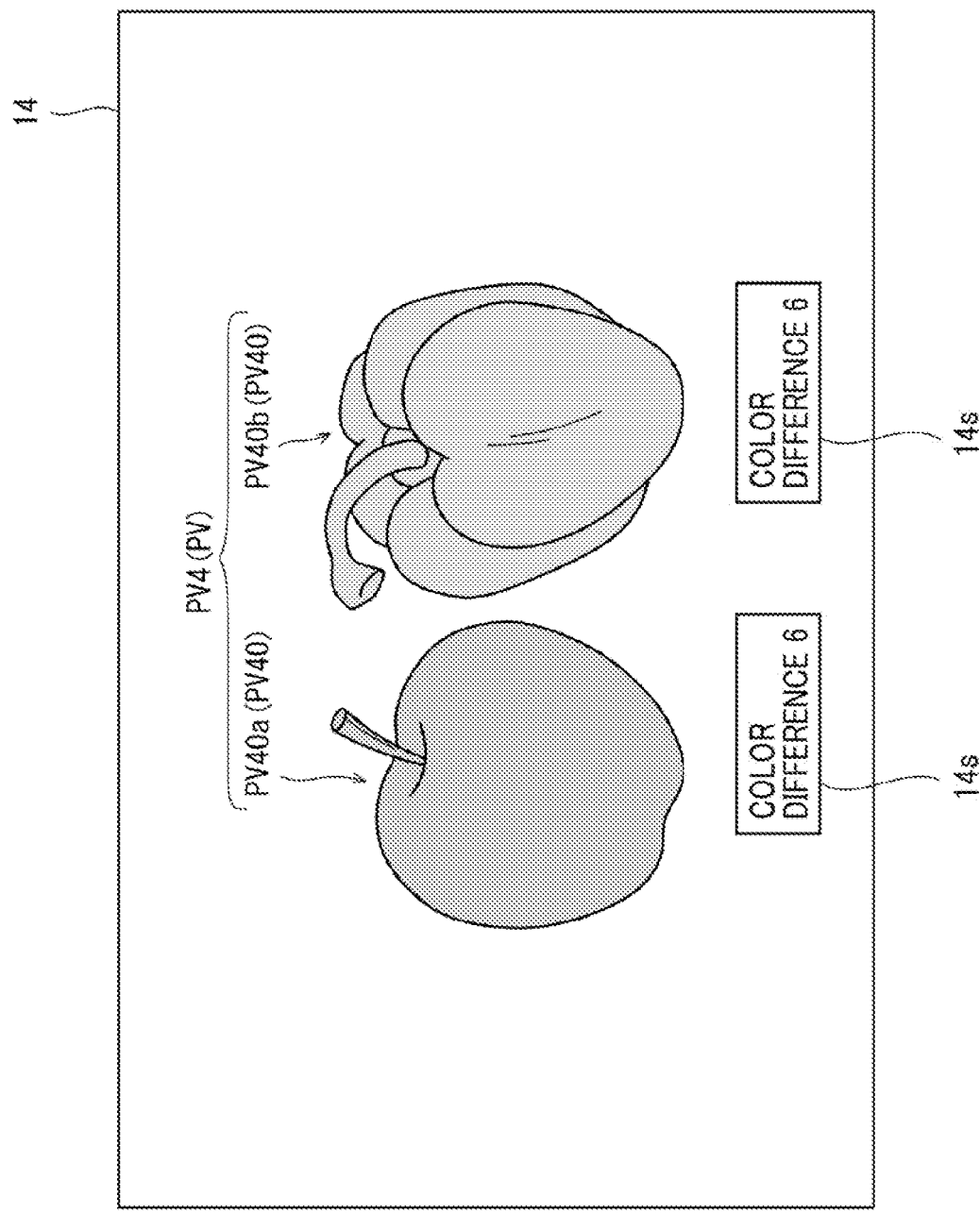
FIG. 10 is a view illustrating a perceptual preview image resulting from a fourth gamut mapping process performed by the control device.

As shown in FIG. 10, the control device 50 displays on the display device 14 a perceptual preview image PV40 represented by image data generated in the perceptual rendering intent process as part of a fourth preview image PV4 obtained in the fourth gamut mapping process. The perceptual preview image PV40 includes an apple preview image PV40a having an eighth red color that differs from the first red color, and a bell pepper preview image PV40b having a ninth red color that differs from the second red color. Through the perceptual rendering intent process, which is one example of the fourth gamut mapping process, reproducibility of the apple image PI1 is lower than in the third gamut mapping process, but a loss of surface irregularities (a loss of gradations) can be suppressed by maintaining tonality in the bell pepper preview image PV40b. The eighth red color is an example of the replacement color. The ninth red color is an example of the replacement color.

As shown in FIG. 10, the control device 50 displays the color difference between the first red color before the perceptual rendering intent process and the eighth red color after the perceptual rendering intent process (i.e., a color resulting from the perceptual rendering intent process on the first red color) in one of the display areas 14s. Further, the control device 50 displays the color difference between the second red color before the perceptual rendering intent process and the ninth red color after the perceptual rendering intent process (i.e., a color resulting from the perceptual rendering intent process on the second red color) in the other display area 14s. As a result, the user can recognize each color difference resulting from the perceptual rendering intent process. Here, the color difference between the first red color before the perceptual rendering intent process and the eighth red color after the perceptual rendering intent process is greater than the color difference between the first red color before the third gamut mapping process and the sixth red color after the third gamut mapping process.

Figure 11:
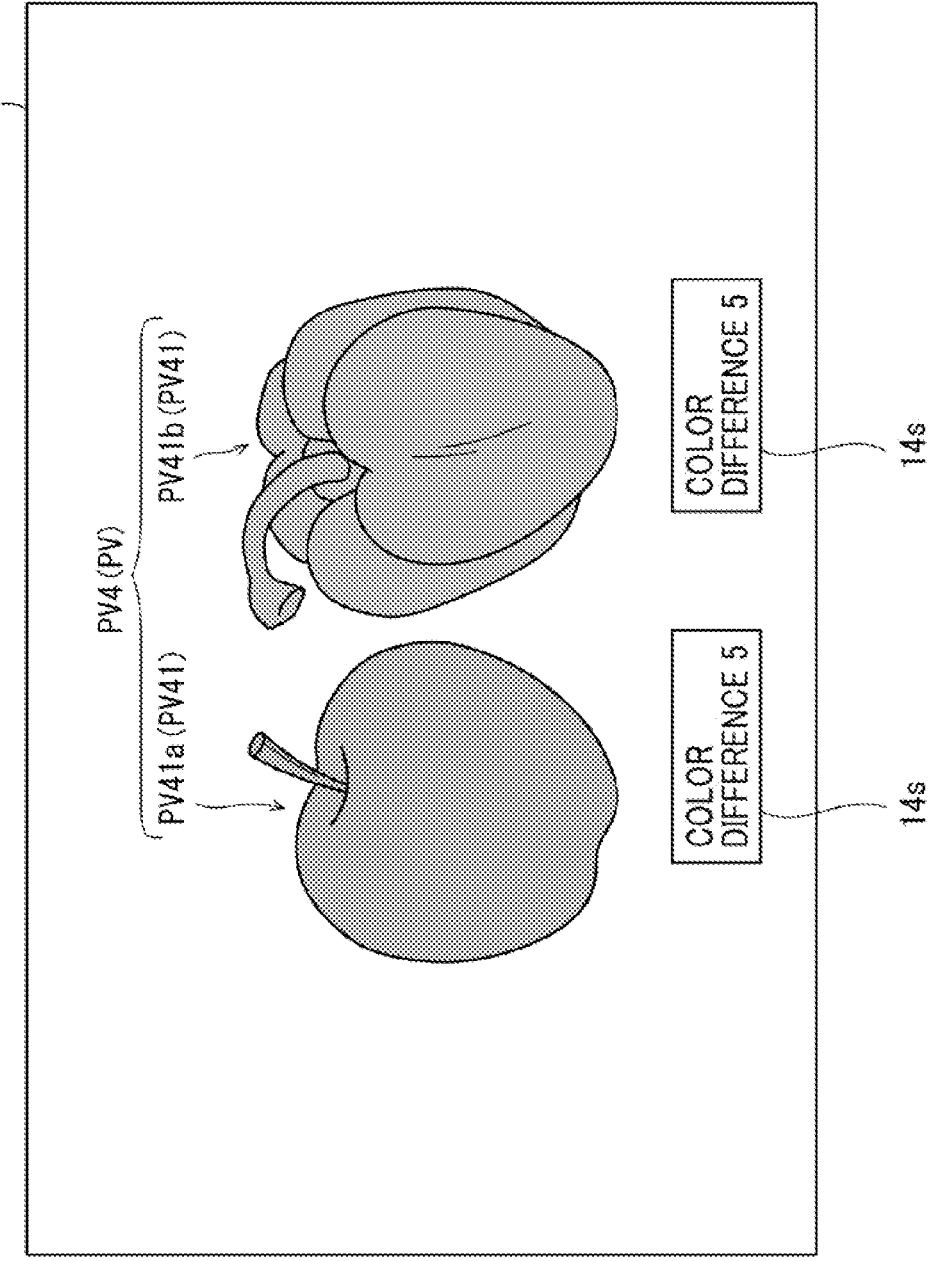
FIG. 11 is a view illustrating a relative preview image resulting from the fourth gamut mapping process performed by the control device.

As shown in FIG. 11, the control device 50 further displays on the display device 14 a relative preview image PV41 represented by image data generated in the relative rendering intent process as part of the fourth preview image PV4. The relative preview image PV41 includes an apple preview image PV41a having a tenth red color that differs from the first red color, and a bell pepper preview image PV41b having an eleventh red color that differs from the second red color. The tenth red color is an example of the replacement color. The eleventh red color is an example of the replacement color.

As shown in FIG. 11, the control device 50 displays the color difference between the first red color before the relative rendering intent process and the tenth red color after the relative rendering intent process (i.e., a color resulting from the relative rendering intent process on the first red color) in one of the display areas 14s. Further, the control device 50 displays the color difference between the second red color before the relative rendering intent process and the eleventh red color after the relative rendering intent process (i.e., a color resulting from the relative rendering intent process on the second red color) in the other display area 14s. As a result, the user can recognize each color difference resulting from the relative rendering intent process. Here, the color difference between the first red color before the relative rendering intent process and the tenth red color after the relative rendering intent process is greater than the color difference between the first red color before the third gamut mapping process and the sixth red color after the third gamut mapping process.

According to the relative rendering intent process, which is an example of the fourth gamut mapping process, the color difference between the first red color before the relative rendering intent process and the tenth red color after the relative rendering intent process can be made smaller than the color difference between the first red color before the perceptual rendering intent process and the eighth red color after the perceptual rendering intent process.

Figure 12:
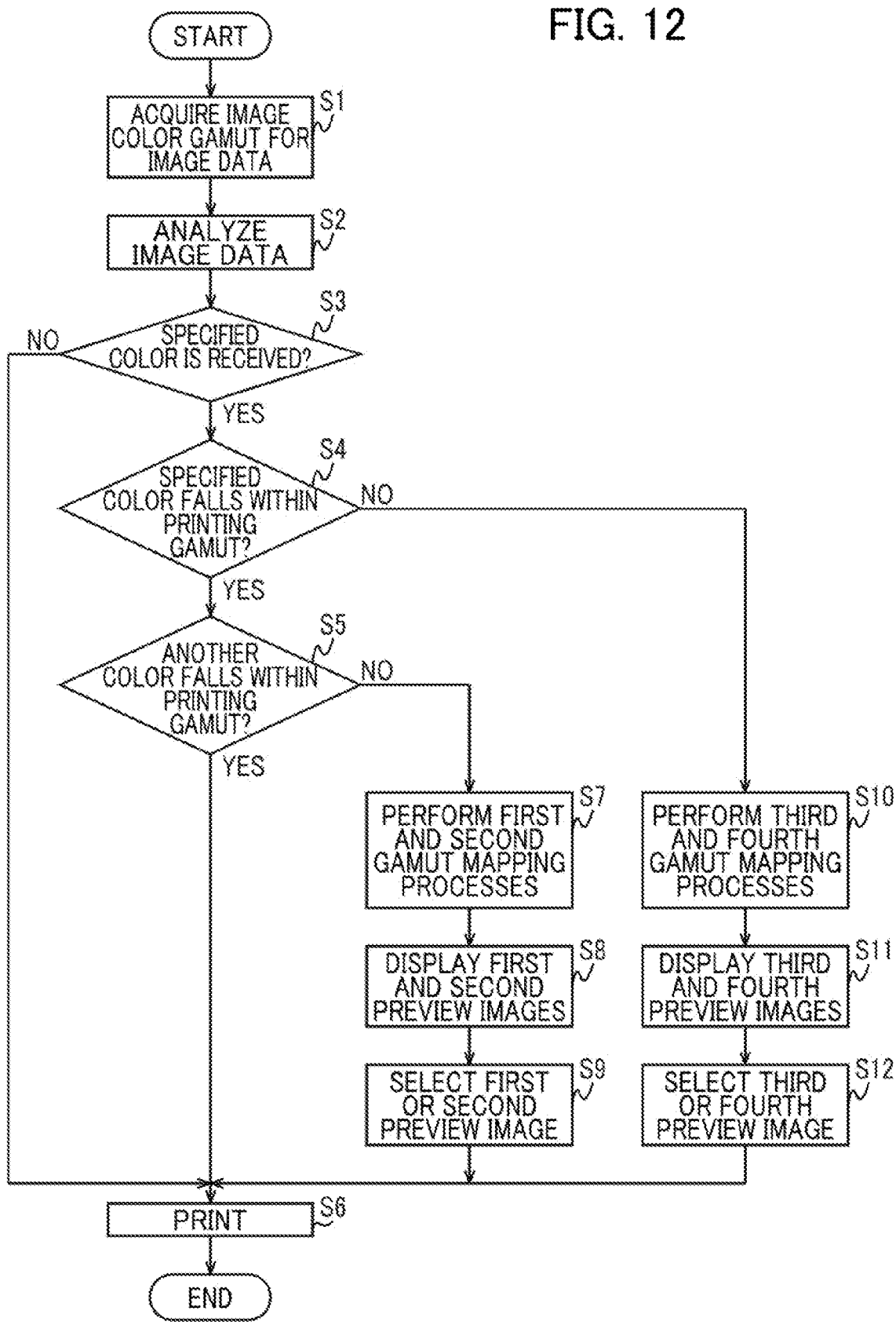
FIG. 12 is a flowchart illustrating steps in a printing method performed by the printing device.

FIG. 12 is a flowchart showing steps in a printing method performed by the printing device 1. The process according to this flowchart begins when the printing device 1 receives a print job including image data via the interface 51. In S1 of FIG. 12, the control device 50 acquires the image color gamut for the image data received from the external device 200. In S2 the control device 50 analyzes the image data. Specifically, in S2 the control device 50 performs a process to determine whether each color value in the image color gamut of the image data, which is RGB data, falls in the printing color gamut.

In S3 the control device 50 determines whether a specified color specified by the user (the first red color of the apple image PI1 in this embodiment) has been received. When a specified color has been received (S3: YES), the control device 50 continues from the process in S4 described below. However, when a specified color has not been received (S3: NO), in S6 the control device 50 controls the ejection heads 20 to print an image represented by the image data without performing color calibration.

In S4 the control device 50 determines whether the color value of the specified color is in the printing color gamut PG. When the color value of the specified color is within the printing color gamut PG (S4: YES), in S5 the control device 50 determines whether the color value of another color (the second red color of the bell pepper image PI2 in the present embodiment) exists in the printing color gamut PG. When the color value for the other color is within the printing color gamut PG (S5: YES), in S6 the control device 50 controls the ejection heads 20 to print an image represented by the image data without performing color calibration.

However, when the color value for the other color is not in the printing color gamut PG (S5: NO), in S7 the control device 50 executes the first gamut mapping process and second gamut mapping process described above. In S8 the control device 50 displays the first preview image PV1 and second preview image PV2 on the display device 14. Subsequently, the control device 50 prompts the user to input the preferred one of the first preview image PV1 and second preview image PV2. In S9 the control device 50 selects the first preview image PV1 or second preview image PV2 based on the user input and in S6 controls the ejection heads 20 to print the selected preview image PV.

However, when the color value of the specified color is not within the printing color gamut PG (S4: NO), in S10 the control device 50 executes the third gamut mapping process and fourth gamut mapping process described above. In S11 the control device 50 displays the third preview image PV3 and fourth preview image PV4 (the perceptual preview image PV40 and relative preview image PV41) on the display device 14. Subsequently, the control device 50 prompts the user to input the preferred one from the third preview image PV3, the perceptual preview image PV40, and the relative preview image PV41. In S12 the control device 50 selects the third preview image PV3, perceptual preview image PV40, or relative preview image PV41 based on the user input and in S6 controls the ejection heads 20 to print the selected preview image PV.

Figure 13:
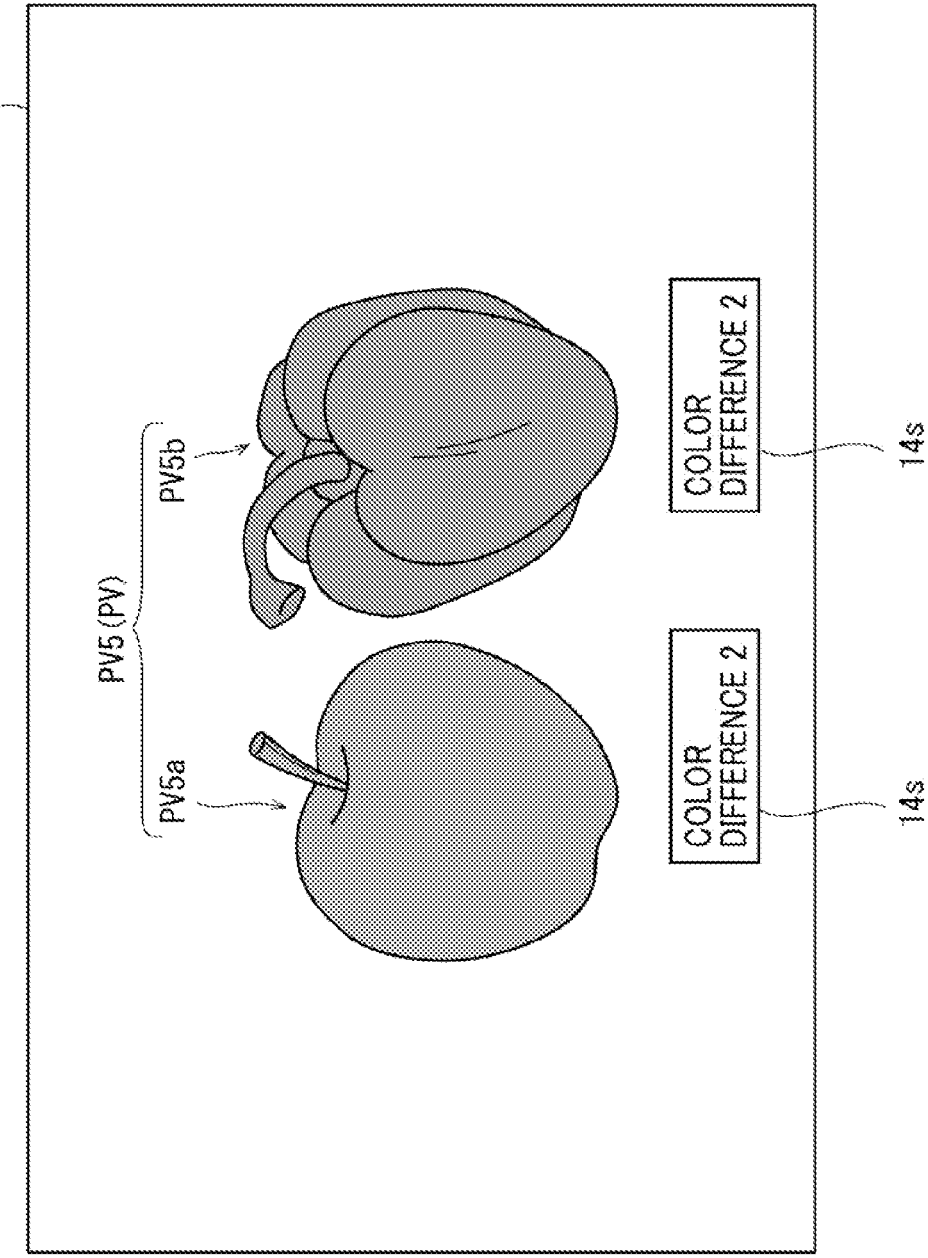
FIG. 13 is a view illustrating a preview image for a case of printing an image on a print medium whose type is different from the type of print medium included in the printing conditions.

When the first red color value f1 is present in the printing color gamut PG while the second red color value f2 is not, the control device 50 may also execute the following process in combination with the first and second gamut mapping processes described above. FIG. 13 shows a preview image PV5 for a case of printing an image on a print medium having a different type from the type of print medium W specified in the printing conditions.

The control device 50 acquires printing conditions that include the type of print medium W. When the first red color value f1 is present in the printing color gamut PG while the second red color value f2 is not, the control device 50 displays the preview image PV5 for a case of printing an image represented by the image data on a different type of print medium (e.g., high-quality paper such as fine paper, woodfree paper, or the like) from the type of print medium W included in the printing conditions, as illustrated in FIG. 13. Also, this process is executed in combination with the third and fourth gamut mapping processes described above.

The preview image PV5 includes an apple preview image PV5a having a twelfth red color that differs from the first red color, and a bell pepper preview image PV5b having a thirteenth red color that differs from the second red color. As shown in FIG. 13, the control device 50 displays the color difference between the first red color before processing and the twelfth red color after processing in one of the display areas 14s and displays the color difference between the second red color before processing and the thirteenth red color after processing in the other display area 14s. Printing an image on high-quality paper, as in this example can expand saturation and density (gradation range).

When the first red color value f1 is present in the printing color gamut PG but the second red color value f2 is not present in the printing color gamut PG, the control device 50 may also execute the following process in combination with the first and second gamut mapping processes described above. FIG. 14 shows a preview image PV6 for a case in which an image represented by the image data is printed on a print medium W using ink in different colors from the basic colors.

Specifically, when the first red color value f1 is in the printing color gamut PG but the second red color value f2 is not, the control device 50 displays the preview image PV6 shown in FIG. 14 for a case of printing an image represented by the image data on a print medium W using special colors of ink that differ from the basic colors. Also, this process is executed in combination with the first and second gamut mapping processes described above.

The preview image PV6 includes an apple preview image PV6a having a fourteenth red color that is the same color as the first red color, and a bell pepper preview image PV6b having a fifteenth red color that is the same color as the second red color. As shown in FIG. 14, the control device 50 displays the color difference between the first red color before processing and the fourteenth red color after processing in one of the display areas 14s and displays the color difference between the second red color before processing and the fifteenth red color after processing in the other display area 14s. This example can obtain an apple preview image PV6a with high reproducibility of the apple image PI1, and a bell pepper preview image PV6b with high reproducibility of the bell pepper image PI2.

When the user has selected the preview image PV6, special color inks stored in the second tanks 12b in FIG. 2 described above are supplied from the second tanks 12b to the second ejection heads 22 along the second channels 13b. More specifically, the storage solution filling the second ejection heads 22 is purged from the second ejection heads 22 and replaced with the special color inks. Therefore, when a purge is executed to discharge storage solution from the nozzles of the second ejection heads 22, the control device 50 determines that a process to introduce special color inks has been performed and that the second channels 13b are filled with special color inks. The control device 50 prints patches on the print medium W for the color values in the preview image PV6 selected by the user. Next, the control device 50 measures the colors of the patches printed on the print medium W with a colorimeter, such as a spectrophotometer, and stores the colorimetric values in the storage unit 53 in association with the color values of the corresponding patches. The control device 50 then creates a calibration profile for calibrating colors in an image being printed to target colors based on the above correlations and controls the ejection heads 20 to print an image corresponding to the preview image PV6 on the print medium W on the basis of the calibration profile.

As described above, the printing device 1 according to the present embodiment displays on the display device 14 the preview images PV corresponding to the results of two or more gamut mapping processes with different methods. Thus, unlike the conventional method of printing an image after performing a uniform gamut mapping process, the method of the embodiment presents the user with preview images PV generated by two or more gamut mapping processes with different methods. The user can select a desired preview image to print from among the two or more preview images PV displayed. As this method allows the user to print a desired image, user satisfaction in printed images can be improved.

Further, the first gamut mapping process in the present embodiment can ensure high reproducibility of the apple image PI1 in the apple preview image PV1a. As a result, the process can ensure high reproducibility of the user's specified color, i.e., the color with which the user is concerned, thereby increasing user satisfaction. With the second gamut mapping process, reproducibility of the apple preview image PV2a relative to the apple image PI1 is lower than that in the first gamut mapping process, but the second gamut mapping process can suppress a loss of surface irregularities (a loss of gradations) in both the apple preview image PV2a and the bell pepper preview image PV2b.

Additionally, the third gamut mapping process in the present embodiment can ensure tonality in the apple preview image PV3a in exchange for reduced reproducibility. Thus, this method can ensure reproducibility and maintain tonality for the user-specified color, i.e., the color on which the user is focused, thereby increasing user satisfaction. Further, the perceptual rendering intent serving as one example of the fourth gamut mapping process has lower reproducibility of the apple image PI1 than that of the third gamut mapping process but can suppress a loss of surface irregularities (a loss of gradations) in the bell pepper preview image PV40b by ensure tonality thereof. Further, the relative rendering intent serving as an example of the fourth gamut mapping process enables the color difference between the colors before and after the relative rendering intent process is performed to be made smaller than the color difference between the colors before and after the perceptual rendering intent process is performed. Thus, reproducibility is comparatively high when using the relative rendering intent.

In the present embodiment, the control device 50 displays the preview image PV5 for a case of printing an image represented by the image data on a different type of print medium (e.g., fine paper) from the type of print medium W specified in the printing conditions. This enables the user to select the preview image PV5 when the user wishes to expand saturation and density (gradation range) by printing the image on high-quality paper.

In the present embodiment, the control device 50 displays the preview image PV6 for a case of printing an image represented by the image data on the print medium W using ink in special colors that differ from the basic colors. Thus, the user can select the preview image PV6 when the user wishes to significantly enhance reproducibility by printing with special colors of ink.

Variations of the Embodiment

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

In the above embodiment, the preview image PV5 is displayed together with the preview images PV produced in the first to fourth gamut mapping processes. However, the preview image PV5 may simply be displayed alone. For example, when the first red color value f1 is present in the printing color gamut PG while the second red color value f2 is not, the control device 50 may display just the preview image PV5 for a case of printing an image represented by the image data on a different type of print medium from the type of print medium W included in the printing conditions, as illustrated in FIG. 13.

Similarly, the preview image PV6 is displayed together with preview images PV produced through the first to fourth gamut mapping processes in the embodiment described above. However, the preview image PV6 may simply be displayed alone. For example, when the first red color value f1 is in the printing color gamut PG but the second red color value f2 is not, the control device 50 may display just the preview image PV6 for a case of printing an image represented by the image data on the print medium W using ink of special colors that differ from the basic colors, as illustrated in FIG. 14.

While an inkjet printer serves as an example of the printing device 1 in the embodiment described above, the printing device 1 may be another printer, such as a laser printer or a thermal printer. A laser printer is provided with a printing unit. The printing unit of the laser printer includes an image carrier such as a photosensitive drum or a photosensitive belt, a charger that charges the image carrier through contact or non-contact, an exposure unit that forms an electrostatic latent image on the charged image carrier using a laser semiconductor or the like (known as "exposure"), a toner cartridge or developing cartridge that supplies toner to the image carrier on which an electrostatic latent image has been formed, a transfer unit such as a transfer roller or transfer belt that transfers the developed toner image from the image carrier directly to a print medium, and a fixing unit such as a fixing roller or fixing belt that thermally fixes the toner (the toner image) transferred onto the print medium. The laser printer is not limited to a direct tandem laser printer but may be an intermediate transfer laser printer. The intermediate transfer laser printer first transfers the developed toner image from the image carrier onto an intermediate transfer belt and then uses the transfer unit to transfer the toner image from the intermediate transfer belt onto the print medium. A thermal printer is provided with a printing unit. The printing unit of the thermal printer includes a thermal head, and an ink ribbon. The thermal head contacts the ink ribbon and transfers ink in the ink ribbon onto a print medium by causing the corresponding heating elements to generate heat.

In the embodiment described above, the preview images PV are displayed on the display device 14 of the printing device 1, but the present disclosure is not limited to this configuration. For example, the preview images PV may be displayed on the display of a personal computer or other device that can communicate with the printing device 1 through cables or wirelessly.

In the embodiment described above, the perceptual rendering intent process and relative rendering intent process are used as examples of the fourth gamut mapping process, but the fourth gamut mapping process is not limited to these processes. Other processes such as an absolute rendering intent process may be executed as the fourth gamut mapping process.

What is claimed is:

1. A printing device comprising:
a printing unit configured to print on a printing medium using colorants in prescribed basic colors; and
a controller configured to perform:
(a) acquiring image data;
(b) acquiring an image color gamut, the image color gamut being a specific area of a predetermined color space that is occupied by color values included in the image data acquired in (a);
(c) receiving information on a first color specified by a user, the first color being present in the image color gamut acquired in (b);
(d) executing, on a basis of whether the first color is present in a printing color gamut, two or more gamut mapping processes on the image data acquired in (a), the two or more gamut mapping processes being different from each other, the printing color gamut being a specific area of the predetermined color space that is occupied by color values of colors printable by the printing unit;
(e) displaying, prior to printing based on the image data acquired in (a), the first color and preview images corresponding to results of the two or more gamut mapping processes; and
(f) printing, using the printing unit, an image corresponding to the preview image selected by the user among the preview images displayed in (e).

2. The printing device according to claim 1,
wherein, in a case where the first color is present in the printing color gamut but a second color, which is present in the image color gamut and is different from the first color, is not present in the printing color gamut, the controller executes, as the two or more gamut mapping processes executed in (d):
a first process to generate image data by maintaining a color value of the first color as is and replacing the second color with a replacement color present in the printing color gamut; and
a second process to generate image data by replacing the first color with a replacement color present in the printing color gamut and replacing the second color with a replacement color present in the printing color gamut so that tonality is maintained between the first color and the second color.

3. The printing device according to claim 2,
wherein the controller is configured to further perform:
(g) determining whether the first color is present in the printing color gamut; and
(h) determining whether the second color is present in the printing color gamut.

4. The printing device according to claim 3,
wherein the controller displays, as the preview images displayed in (e):
a first preview image corresponding to the image data generated by the first process; and
a second preview image corresponding to the image data generated by the second process.

5. The printing device according to claim 4,
wherein the controller is configured to further perform:
(i) displaying:
a color difference between the first color before the first process and the first color after the first process;
a color difference between the second color before the first process and the replacement color resulting from the first process on the second color;
a color difference between the first color before the second process and the replacement color resulting from the second process on the first color; and
a color difference between the second color before the second process and the replacement color resulting from the second process on the second color.

6. The printing device according to claim 4,
wherein the controller is configured to further perform:
(i) acquiring a printing condition including a type of printing medium, and
wherein, in a case where the first color is present in the printing color gamut but the second color is not present in the printing color gamut, the controller displays a preview image for a case of printing an image based on the image data acquired in (a) on a printing medium having a different type from the type of printing medium included in the printing condition acquired in (i).

7. The printing device according to claim 4,
wherein, in a case where the first color is present in the printing color gamut but the second color is not present in the printing color gamut, the controller displays a preview image for a case of printing an image based on the image data acquired in (a) on the printing medium using colorants in different colors from the prescribed basic colors.

8. The printing device according to claim 1,
wherein, in a case where the first color is not present in the printing color gamut and a second color, which is present in the image color gamut and is different from the first color, is not present in the printing color gamut, the controller executes, as the two or more gamut mapping processes executed in (d):
- a third process to generate image data by replacing the first color with a replacement color present in the printing color gamut and replacing the second color with a replacement color present in the printing color gamut while giving priority to approximating the first color over the second color; and
- a fourth process to generate image data by replacing the first color with a replacement color present in the printing color gamut and replacing the second color with a replacement color present in the printing color gamut so that tonality is maintained between the first color and the second color.

9. The printing device according to claim 8,
wherein the controller is configured to further perform:
- (g) determining whether the first color is present in the printing color gamut; and
- (h) determining whether the second color is present in the printing color gamut.

10. The printing device according to claim 8,
wherein the controller displays, as the preview images displayed in (e):
- a third preview image corresponding to the image data generated by the third process; and
- a fourth preview image corresponding to the image data generated by the fourth process.

11. The printing device according to claim 10,
wherein the fourth process comprises a perceptual rendering intent process and a relative rendering intent process, and
wherein the controller displays, as the fourth preview image:
- a perceptual preview image corresponding to the image data generated by the perceptual rendering intent process; and
- a relative preview image corresponding to the image data generated by the relative rendering intent process.

12. The printing device according to claim 11,
wherein the controller is configured to further perform:
- (g) displaying:
  - a color difference between the first color before the third process and the replacement color resulting from the third process on the first color, and a color difference between the second color before the third process and the replacement color resulting from the third process on the second color;
  - a color difference between the first color before the perceptual rendering intent process and the replacement color resulting from the perceptual rendering intent process on the first color, and a color difference between the second color before the perceptual rendering intent process and the replacement color resulting from the perceptual rendering intent process on the second color; and
  - a color difference between the first color before the relative rendering intent process and the replacement color resulting from the relative rendering intent process on the first color, and a color difference between the second color before the relative rendering intent process and the replacement color resulting from the relative rendering intent process on the second color.

13. The printing device according to claim 12,
wherein the color difference between the first color before the perceptual rendering intent process and the replacement color resulting from the perceptual rendering intent process on the first color is greater than the color difference between the first color before the third process and the replacement color resulting from the third process on the first color, and
wherein the color difference between the first color before the relative rendering intent process and the replacement color resulting from the relative rendering intent process on the first color is greater than the color difference between the first color before the third process and the replacement color resulting from the third process on the first color.

14. The printing device according to claim 13,
wherein the color difference between the first color before the relative rendering intent process and the replacement color resulting from the relative rendering intent process on the first color is smaller than the color difference between the first color before the perceptual rendering intent process and the replacement color resulting from the perceptual rendering intent process on the first color.

15. The printing device according to claim 10,
wherein the controller is configured to further perform:
- (g) acquiring a printing condition including a type of printing medium, and
wherein, in a case where the first color is not present in the printing color gamut and the second color is not present in the printing color gamut, the controller displays a preview image for a case of printing an image based on the image data acquired in (a) on a printing medium having a different type from the type of printing medium included in the printing condition acquired in (g).

16. The printing device according to claim 10,
wherein, in a case where the first color is not present in the printing color gamut and the second color is not present in the printing color gamut, the controller displays a preview image for a case of printing an image based on the image data acquired in (a) on the printing medium using colorants in different colors from the prescribed basic colors.

17. The printing device according to claim 1, further comprising:
a display unit configured to display an image,
wherein the preview images are displayed in (e) on the display unit.

18. A printing method using a printing device including a printing unit,
the printing method comprising:
- (a) acquiring image data;
- (b) acquiring an image color gamut, the image color gamut being a specific area of a predetermined color space that is occupied by color values included in the image data acquired in (a);
- (c) receiving information on a first color specified by a user, the first color being present in the image color gamut acquired in (b);
- (d) executing, on a basis of whether the first color is present in a printing color gamut, two or more gamut mapping processes on the image data acquired in (a), the two or more gamut mapping processes being different from each other, the printing color gamut being a specific area of the predetermined color space that is occupied by color values of colors printable by the printing unit;

(e) displaying, prior to printing based on the image data acquired in (a), the first color and preview images corresponding to results of the two or more gamut mapping processes; and
(f) printing, using the printing unit, an image corresponding to the preview image selected by the user among the preview images displayed in (e).

19. A non-transitory computer-readable storage medium storing a set of instructions for a printing device including a printing unit and a controller, the printing unit being configured to print on a printing medium using colorants in prescribed basic colors, the set of instructions, when executed by the controller, causing the printing device to perform:
  (a) acquiring image data;
  (b) acquiring an image color gamut, the image color gamut being a specific area of a predetermined color space that is occupied by color values included in the image data acquired in (a);
  (c) receiving information on a first color specified by a user, the first color being present in the image color gamut acquired in (b);
  (d) executing, on a basis of whether the first color is present in a printing color gamut, two or more gamut mapping processes on the image data acquired in (a), the two or more gamut mapping processes being different from each other, the printing color gamut being a specific area of the predetermined color space that is occupied by color values of colors printable by the printing unit;
  (e) displaying, prior to printing based on the image data acquired in (a), the first color and preview images corresponding to results of the two or more gamut mapping processes; and
  (f) printing, using the printing unit, an image corresponding to the preview image selected by the user among the preview images displayed in (e).

* * * * *